US 11,667,094 B2

(12) United States Patent
Hopkins et al.

(10) Patent No.: US 11,667,094 B2
(45) Date of Patent: Jun. 6, 2023

(54) METHOD OF MANUFACTURING FLUID-FILLED CHAMBERS

(71) Applicant: NIKE, Inc., Beaverton, OR (US)

(72) Inventors: Timothy P. Hopkins, Lake Oswego, OR (US); Matthew W. Thornton, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/527,922

(22) Filed: Nov. 16, 2021

(65) Prior Publication Data

US 2022/0072820 A1 Mar. 10, 2022

Related U.S. Application Data

(63) Continuation of application No. 16/289,161, filed on Feb. 28, 2019, now Pat. No. 11,186,055.
(Continued)

(51) Int. Cl.
*B29C 51/12* (2006.01)
*B29D 35/14* (2010.01)
(Continued)

(52) U.S. Cl.
CPC ............ *B29D 35/142* (2013.01); *A43B 13/20* (2013.01); *B29C 51/12* (2013.01); *B29C 65/02* (2013.01);
(Continued)

(58) Field of Classification Search
CPC ........ B29C 51/425; B29C 65/02; B29C 65/18
See application file for complete search history.

(56) References Cited

U.S. PATENT DOCUMENTS 3,281,301 A 10/1966 Bolesky
3,289,281 A 12/1966 Agin
(Continued)

FOREIGN PATENT DOCUMENTS

CN 1044897 A 8/1990
CN 102026558 A 4/2011
(Continued)

OTHER PUBLICATIONS

European Patent Office (ISA), International Search Report and Written Opinion for International Application No. PCT/US2019/020210, dated Jun. 11, 2019.
(Continued)

*Primary Examiner* — Edmund H Lee
(74) *Attorney, Agent, or Firm* — Honigman LLP; Matthew H. Szalach; Jonathan P. O'Brien

(57) ABSTRACT

A method includes positioning a first polymer sheet on a substantially first flat surface of a tool, positioning a second polymer sheet on the first polymer sheet, and moving a second substantially flat surface of the tool into contact with the second polymer sheet. The method also includes maintaining a gap between the first polymer sheet and the second polymer sheet at a predetermined area and heating one of the two substantially flat surfaces of the tool to heat one of the first polymer sheet and the second polymer sheet. The method further includes joining the first polymer sheet and the second polymer sheet together at locations outside of the predetermined area to define a peripheral bond of the chamber.

13 Claims, 15 Drawing Sheets

Related U.S. Application Data

(60) Provisional application No. 62/636,883, filed on Mar. 1, 2018.

(51) Int. Cl.
*A43B 13/20* (2006.01)
*B29C 65/18* (2006.01)
*B29C 65/02* (2006.01)
*B29K 105/00* (2006.01)
*A43B 13/18* (2006.01)

(52) U.S. Cl.
CPC ............ *B29C 65/18* (2013.01); *B29D 35/148* (2013.01); *A43B 13/189* (2013.01); *B29K 2105/256* (2013.01)

(56) References Cited

U.S. PATENT DOCUMENTS

| | | | |
|---|---|---|---|
| 3,982,877 A | 9/1976 | Wyeth et al. | |
| 4,025,974 A | 5/1977 | Lea et al. | |
| 4,999,072 A | 3/1991 | Dischler | |
| 5,108,532 A | 4/1992 | Thein et al. | |
| 5,225,015 A | 7/1993 | Allaire et al. | |
| 5,283,028 A | 2/1994 | Breezer et al. | |
| 5,648,109 A | 7/1997 | Gutowski et al. | |
| 5,932,167 A | 8/1999 | Fritz et al. | |
| 6,837,951 B2 | 1/2005 | Rapaport | |
| 7,588,654 B2 | 9/2009 | Schindler et al. | |
| 7,591,919 B2 | 9/2009 | Schindler et al. | |
| 8,151,486 B2* | 4/2012 | Dua ...................... | A43B 13/20 36/102 |
| 8,308,883 B2* | 11/2012 | Rapaport ................ | B29C 65/02 156/308.2 |
| 8,470,113 B2 | 6/2013 | Beye et al. | |
| 8,703,039 B2 | 4/2014 | Schober et al. | |
| 10,694,814 B2* | 6/2020 | Bailey .................... | A43B 13/04 |
| 2003/0098118 A1 | 5/2003 | Rapaport | |
| 2008/0182046 A1 | 7/2008 | Brambrink et al. | |
| 2009/0288313 A1 | 11/2009 | Rapaport et al. | |
| 2013/0333827 A1* | 12/2013 | Beye .................... | B29D 35/122 156/145 |
| 2015/0013190 A1* | 1/2015 | Davison ............... | A43B 13/185 36/102 |
| 2018/0255871 A1* | 9/2018 | Conway ................... | B32B 3/30 |

FOREIGN PATENT DOCUMENTS

| | | |
|---|---|---|
| CN | 102601994 A | 7/2012 |
| CN | 104334043 A | 2/2015 |
| EP | 0768047 A2 | 4/1997 |
| EP | 1468816 A1 | 10/2004 |
| EP | 2329732 A2 | 6/2011 |
| WO | WO-9312685 A1 | 7/1993 |
| WO | 2009143002 A2 | 11/2009 |
| WO | WO-2018213215 A1 | 11/2018 |

OTHER PUBLICATIONS

China Patent Office, Office Action dated May 18, 2021 for app No. 201980016580.4.

United States Patent and Trademark Office, Non-Final Office Action for U.S. Appl. No. 16/289,161 dated Feb. 11, 2021.

Chinese Patent Office, Decision of Rejection for Application No. 201980016580.4, dated May 5, 2022.

* cited by examiner

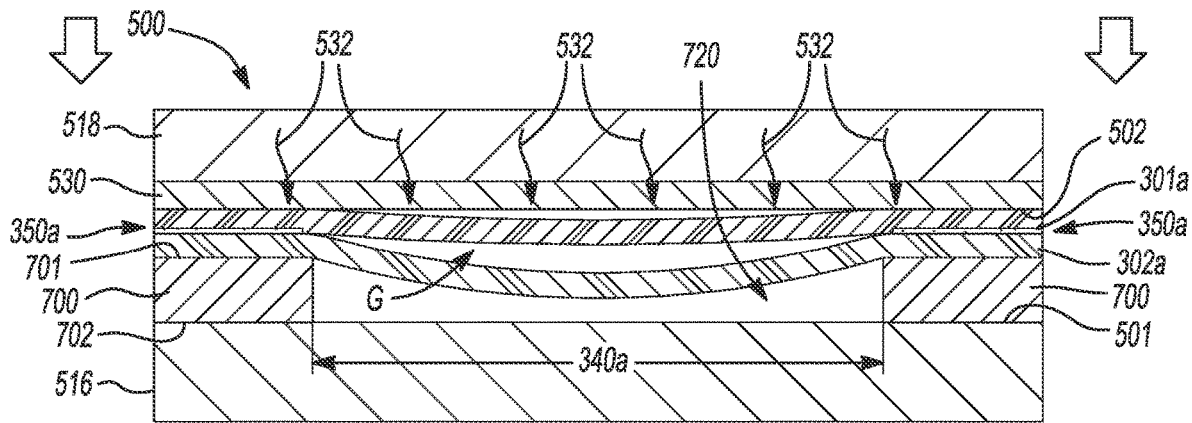
*Fig-18*
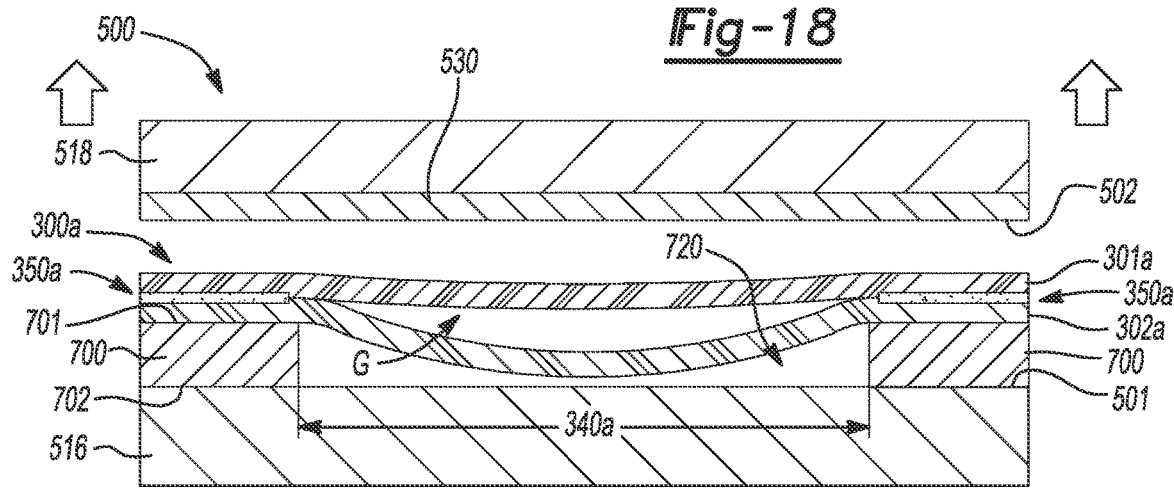
*Fig-19*
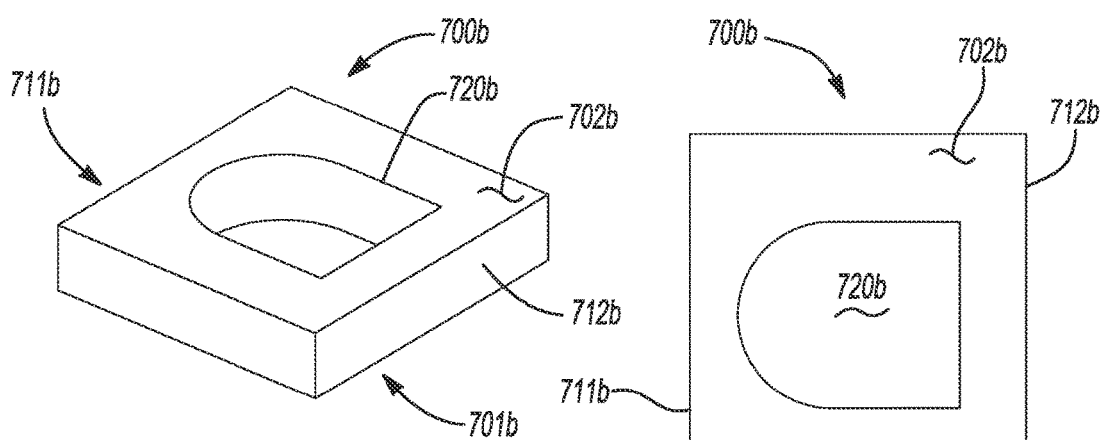
*Fig-20*
*Fig-21*

METHOD OF MANUFACTURING FLUID-FILLED CHAMBERS

CROSS REFERENCE TO RELATED APPLICATION

This application is a continuation of U.S. patent application Ser. No. 16/289,161, filed Feb. 28, 2019, which claims priority to U.S. Provisional Application No. 62/636,883, filed Mar. 1, 2018, the contents of which are hereby incorporated by reference in their entirety.

FIELD

The present disclosure relates to methods of manufacturing fluid-filled chambers and more particularly to methods of manufacturing fluid-filled chambers for incorporation into articles of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and may include a pressurized fluid-filled chamber that compresses resiliently under an applied load to cushion the foot by attenuating ground-reaction forces.

Fluid-filled chambers are generally formed from two polymer sheets of material that join together to define a peripheral bond of the fluid-filled chambers. A pressurized fluid is then supplied between the two polymer sheets to inflate the chamber. A tool having upper and lower mold portions is generally used to impart a desired shape of the chamber and apply heat for joining the two polymer sheets together. Generally, for a fluid-filled chamber tailored for a specific article of footwear, multiple tools need to be designed and produced to manufacture fluid-filled chambers for each shoe size. Moreover, mold tools are generally specific to the desired shape and, therefore, separate mold tools need to be designed and produced for manufacturing fluid-filled chambers with different shapes.

DRAWINGS

The drawings described herein are for illustrative purposes only of selected configurations and are not intended to limit the scope of the present disclosure.

FIG. 18 is a schematic view of the heat press tool of FIG. 14 showing the first polymer sheet and the second polymer sheet maintaining the gap at locations within the interior void of the jig when the heat press tool is in the closed position;

FIG. 19 is a schematic view of the heat press tool of FIG. 14 showing the heat press tool in the open position and the first polymer sheet and the second polymer sheet joined together to define the peripheral bond;

FIG. 20 is a perspective view of a jig defining an interior void in accordance with principles of the present disclosure;

FIG. 21 is a top view of the jig of FIG. 20;

Corresponding reference numerals indicate corresponding parts throughout the drawings.

DETAILED DESCRIPTION

Figure 1:
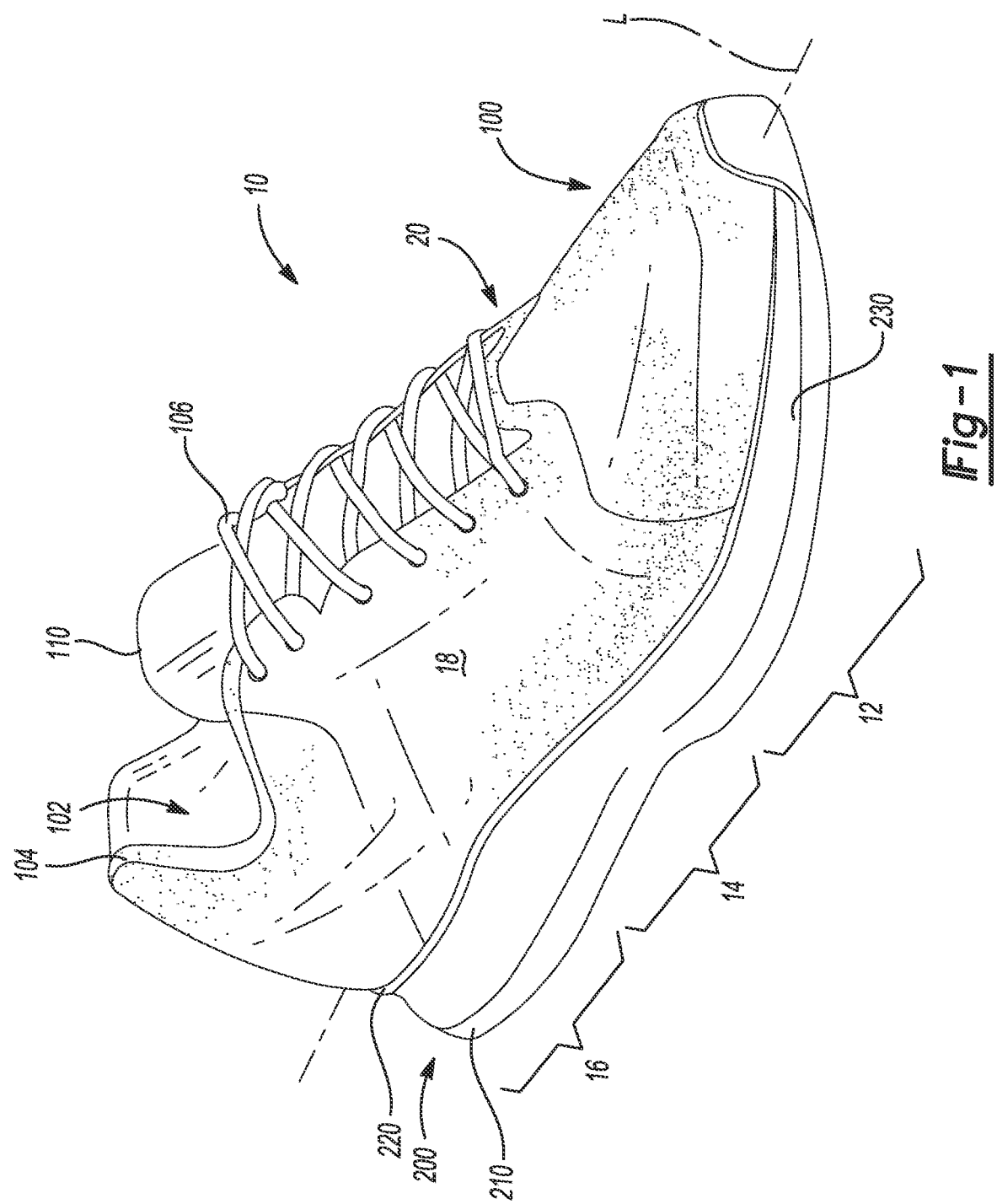
FIG. 1 is a top perspective view of an article of footwear in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming a chamber. The method includes positioning a first polymer sheet on a substantially first flat surface of a tool, positioning a second polymer sheet on the first polymer sheet, and moving a second substantially flat surface of the tool into contact with the second polymer sheet. The method also includes maintaining a gap between the first polymer sheet and the second polymer sheet at a predetermined area and heating one of the two substantially flat surfaces of the tool to heat one of the first polymer sheet and the second polymer sheet. The method further includes joining the first polymer sheet and the second polymer sheet together at locations outside of the predetermined area to define a peripheral bond of the chamber.

Implementations of the disclosure may include one or more of the following optional features. In some implementations, maintaining the gap between the first polymer sheet and the second polymer sheet includes adding a tensile element defining the predetermined area between the first polymer sheet and the second polymer sheet. The method may also include heating the one of the two substantially flat surfaces of the tool to heat an entire surface of the one of the two polymer sheets.

Adding the tensile element defining the predetermined area between the first polymer sheet and the second polymer sheet may include positioning a first tensile layer of the tensile element in contact with the first polymer sheet and positioning a second tensile layer of the tensile element in contact with the second polymer sheet. Heating one of the two substantially flat surfaces of the tool may bond one of the first polymer sheet and the second polymer sheet to a respective one of the first tensile layer and the second tensile layer.

In some examples, the method includes moving the second substantially flat surface of the tool away from the second polymer sheet after joining the first polymer sheet and the second polymer sheet and positioning the second polymer sheet on the substantially first flat surface of the tool. The method may also include moving the second substantially flat surface of the tool into contact with the first polymer sheet and heating the one of the two substantially flat surfaces of the tool to heat the other of the first polymer sheet and the second polymer sheet.

Heating the other of the first polymer sheet and the second polymer sheet may cause the other of the first polymer sheet and the second polymer sheet to bond to a respective one of the first tensile layer and the second tensile layer. In some examples, the method includes heating the other of the two substantially flat surfaces of the tool to heat a surface of the other of the first polymer sheet and the second polymer sheet. Joining the first polymer sheet and the second polymer sheet together at locations outside of the predetermined area may include joining the first polymer sheet to the first tensile layer and joining the second polymer sheet to the second tensile layer at locations within the predetermined area.

In some examples, the method includes positioning a jig between the first polymer sheet and the substantially first flat surface of the tool. Maintaining the gap between the first polymer sheet and the second polymer sheet at the predetermined area may include maintaining the gap between the first polymer sheet and the second polymer sheet within a void defined by the jig. The method may further include supplying a pressurized fluid into an area between the first polymer sheet and the second polymer sheet after joining the first polymer sheet and the second polymer sheet together to inflate the chamber.

Another aspect of the disclosure provides another method of forming a chamber. The method includes positioning a jig defining an interior void in a first position on a first surface of a tool, positioning a first polymer sheet on the jig, and positioning a second polymer sheet on the first polymer sheet. The method also includes moving a second surface of the tool into contact with the second polymer sheet, heating the tool to heat one of the first polymer sheet and the second polymer sheet, and joining the first polymer sheet and the second polymer sheet together at locations outside of the interior void defined by the jig to define a peripheral bond of the chamber.

This aspect may include one or more of the following optional features. In some implementations, the method includes maintaining a gap between the first polymer sheet and the second polymer sheet. The gap may have a predetermined area including a shape defined by the interior void of the jig. Heating the tool to heat one of the first polymer sheet and the second polymer sheet may include heating the second surface of the tool to heat the second polymer sheet.

In some examples, the method includes moving the second surface of the tool away from the second polymer sheet after heating the second polymer sheet, positioning the second polymer sheet on the jig, moving the second surface of the tool into contact with the first polymer sheet, and heating the second surface of the tool to heat the first polymer sheet. Positioning the second polymer sheet on the jig may include positioning the peripheral bond on the jig.

The method may also include moving the second surface of the tool away from the second polymer sheet after heating the second polymer sheet, rotating the jig 180°, and positioning the jig in a second position on the first surface of the tool after rotating the jig 180°. The method may further include positioning the second polymer sheet on the jig, moving the second surface of the tool into contact with the first polymer sheet, heating the second surface of the tool to heat the first polymer sheet, and joining the first polymer sheet and the second polymer sheet together at locations outside of the interior void defined by the jig to define the peripheral bond of the chamber.

In some implementations, the method includes maintaining the gap between the first polymer sheet and the second polymer sheet at the predetermined area within the interior void defined by the jig. Positioning the second polymer sheet on the jig may include positioning the peripheral bond on the jig when the jig is in the second position. The method may also include supplying a pressurized fluid into an area between the first polymer sheet and the second polymer sheet after joining the first polymer sheet and the second polymer sheet together to inflate the chamber.

In some configurations, positioning the first polymer sheet on the jig includes positioning a first thermoformed polymer sheet on the jig. In these configurations, positioning the second polymer sheet on the first polymer sheet may include positioning a second thermoformed polymer sheet on the first thermoformed polymer sheet. In some examples, positioning the second polymer sheet on the first polymer sheet includes positioning the second polymer sheet that is not thermoformed on the first thermoformed polymer sheet. In these examples, gravity may cause the second polymer sheet to sag relative to the first thermoformed polymer sheet.

Figure 2:
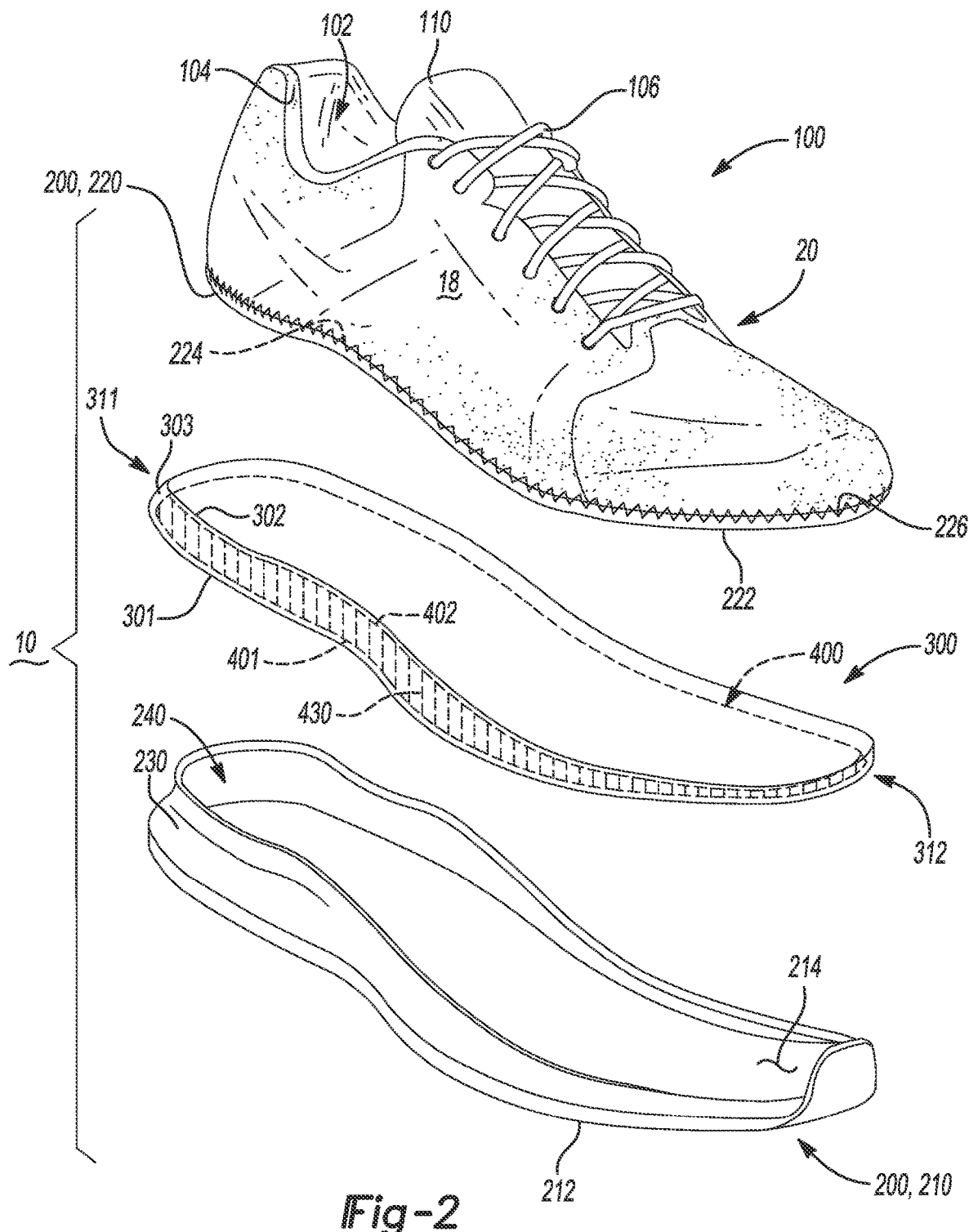
FIG. 2 is an exploded view of the article of footwear of FIG. 1 showing a fluid-filled chamber incorporating a tensile element received within a cavity between an inner surface of an outsole and a bottom surface of a strobel.

Referring to FIGS. 1 and 2, an article of footwear 10 is provided and includes an upper 100 and a sole structure 200 attached to the upper 100. The article of footwear 10 may be divided into one or more portions. The portions may include a forefoot portion 12, a mid-foot portion 14, and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200. An ankle opening 104 in the heel portion 16 may provide access to the interior void 102. For example, the ankle opening 104 may receive a foot to secure the foot within the void 102 and facilitate entry and removal of the foot to and from the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a strobel 220 arranged in a layered configuration. The sole structure 200 (e.g., the outsole 210 and the strobel 220) defines a longitudinal axis L. For example, the outsole 210 engages with a ground surface during use of the article of footwear 10 and the strobel 220 is disposed between the upper 100 and the outsole 210. In some examples, the sole structure 200 may also incorporate additional layers such as an insole or sockliner (neither shown), which may reside within the interior void 102 of the upper 100 to receive a plantar surface of the foot to enhance the comfort of the footwear 10. In some examples, a sidewall 230 surrounds a perimeter of the outsole 210 and separates the outsole 210 and the strobel 220 to define a cavity 240 therebetween.

In some configurations, the cavity 240 receives a fluid-filled chamber 300 filled with a pressurized fluid such as air, nitrogen, helium, sulfur, hexafluoride, or liquids/gels to enhance cushioning characteristics of the footwear 10 in response to ground-reaction forces. The fluid-filled chamber 300 defines an interior cavity that receives the pressurized fluid while providing a durable sealed barrier for retaining the pressurized fluid therein. The chamber 300 may include a lower barrier portion 301 that opposes the outsole 210 and an upper barrier portion 302 disposed on an opposite side of the chamber 300 than the lower barrier portion 301 and opposing the strobel 220. The lower barrier portion 301 may correspond to a first polymer sheet and the upper barrier portion 302 may correspond to a second polymer sheet that joins to the first polymer sheet to define a peripheral bond 350 (FIGS. 6-9) of the chamber 300. Here, the peripheral bond 350 defines a predetermined area associated with the interior cavity that receives and retains the pressurized fluid therein. Accordingly, the peripheral bond 350 forms a sidewall 303 that extends around the periphery of the chamber 300 to connect the lower barrier portion 301 to the upper barrier portion 302.

In some configurations, the interior cavity of the fluid-filled chamber 300 also receives a tensile element 400 having a lower tensile layer 401 that attaches to lower barrier portion 301, an upper tensile layer 402 that attaches to the upper barrier portion 302, and a plurality of tensile elements 430 that extend between the lower and upper tensile layers 401 and 402, respectively, of the tensile element 400. Thermobonding may be used to secure the tensile element 400 to the chamber 300. The tensile element 400 is operative to prevent the chamber 300 from expanding outward or otherwise distending due to the pressure of the fluid within the internal cavity of the chamber 300. Namely, the tensile element 400 may limit expansion of the chamber 300 when under pressure to retain an intended shape of surfaces of the barrier portions 301 and 302.

The chamber 300 may define a length that extends substantially parallel to the longitudinal axis L of the sole structure 200 and may be formed to provide contours that conform to a profile of the bottom surface of the foot as well as an inner surface 214 of the outsole 210. In some configurations, the chamber 300 defines a length that only extends through a portion of the length of the sole structure 200. For instance, the chamber 300 may reside in the heel portion 16 of the sole structure 200 to provide cushioning for the heel of the foot. Additionally or alternatively, two or more chambers 300 may reside in the sole structure 200 each defining a length that extends along a portion of the length of the sole structure 200. In other configurations, two or more chambers 300 may be layered upon one another that react differently in response to ground-reaction forces to provide gradient cushioning for the foot. While the sole structure 200 may include more than one chamber 300, the sole structure 200 will be described and shown as including a single chamber 300 that extends along the longitudinal axis L from the forefoot portion 12 to the heel portion 16.

The outsole 210 may include a ground-engaging surface 212 and the opposite inner surface 214. The outsole 210 may attach to the upper 100. In some examples, the sidewall 230 extends from the perimeter of the outsole 210 and attaches to the strobel 220 or the upper 100. The example of FIG. 1 shows the outsole 210 attaching to the upper 100 proximate to a tip of the forefoot portion 12. The outsole 210 generally provides abrasion-resistance and traction with the ground surface during use of the article of footwear 10. The outsole 210 may be formed from one or more materials that impart durability and wear-resistance, as well as enhance traction with the ground surface. For example, rubber may form at least a portion of the outsole 210.

The strobel 220 may include a bottom surface 222 and a footbed 224 disposed on an opposite side of the strobel 220 than the bottom surface 222. Stitching 226 or adhesives may secure the strobel 220 to the upper 100. The footbed 224 may be contoured to conform to a profile of the bottom surface (e.g., plantar) of the foot. The bottom surface 222 may oppose the inner surface 214 of the outsole 210 to define the cavity 240 therebetween. The strobel 220 may be formed from a flexible material that allows the strobel 220 to conform to the fluid-filled chamber 300 residing in the cavity 240 underneath the strobel 220. In so doing, the flexible strobel 220 allows the pressurized fluid retained by the fluid-filled chamber 300 within in the cavity 240 to interact with the profile of the bottom surface of a foot during gradient loading of the sole structure 200. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under applied loads to attenuate ground-reaction forces.

FIG. 2 provides an exploded view of the article of footwear 10 showing the fluid-filled chamber 300 retaining the pressurized fluid (e.g., air), the inner surface 214 of the outsole 210, and the bottom surface 222 of the strobel 220. The length of the chamber 300 may extend between a first end 311 and a second end 312. The first end 311 may be disposed proximate to the heel portion 16 of the sole structure 200 and the second end 312 may be disposed proximate to the forefoot portion 12 of the sole structure 200. The chamber 300 may also include a thickness extending substantially perpendicular to the longitudinal axis L of the sole structure 200 and a width extending between the lateral side 18 and the medial side 20. Accordingly, the length, the width, and the thickness of the chamber 300 may substantially occupy the cavity 240 defined by the inner surface 214 and the bottom surface 222 and may extend through the forefoot, mid-foot, and heel portions 12, 14, 16, respectively, of the outsole 210.

Figure 3:
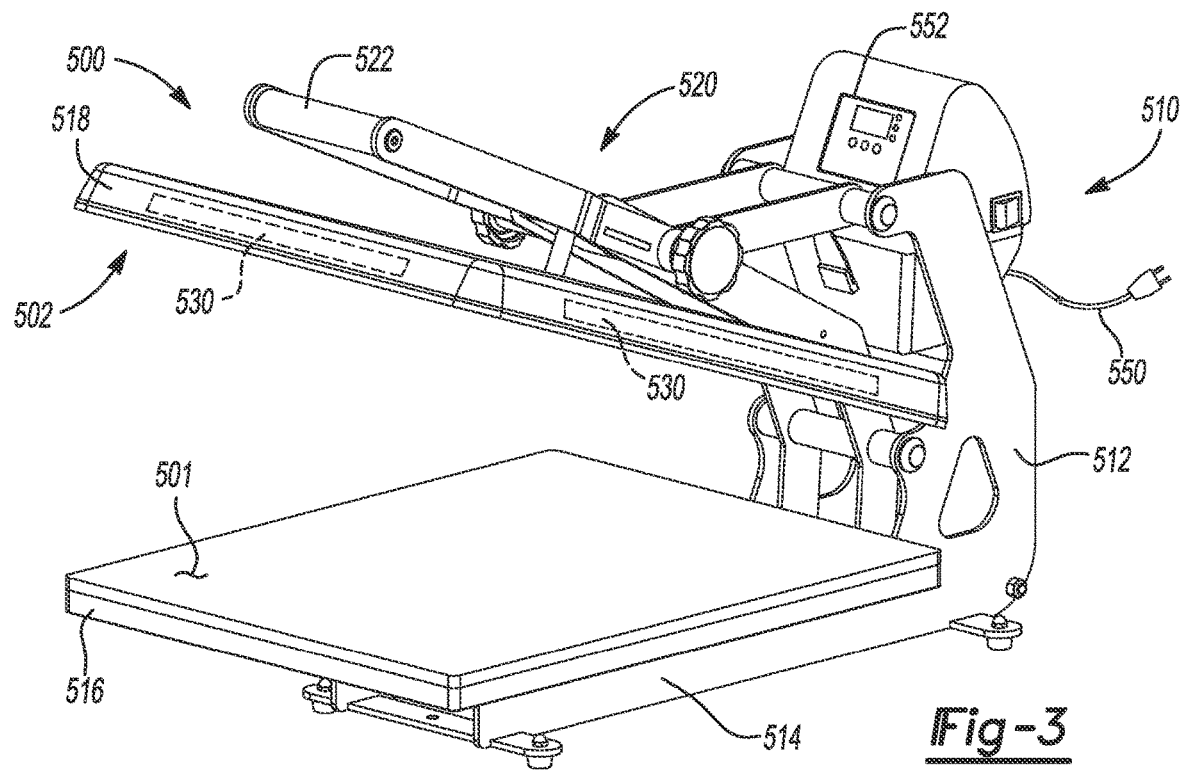
FIG. 3 is a perspective view of a heat press tool including a lower platen and an upper platen movable relative to the lower platen between an open position and a closed position in accordance with principles of the present disclosure.

FIG. 3 is a perspective view of a heat press tool 500 for use in manufacturing the fluid-filled chamber 300 by applying heat and pressure to join the lower barrier portion 301 (e.g., first polymer sheet) and the upper barrier portion 302 (e.g., second polymer sheet) together to define the peripheral bond 350 of the chamber 300. In configurations when the chamber 300 includes the tensile element 400 for limiting expansion of the chamber 300 when the pressurized fluid (e.g., air) is supplied into the internal cavity, the application of heat and pressure by the heat press tool 500 is also operative to bond the lower barrier portion 301 and the upper barrier portion 302 to respective ones of the lower tensile layer 401 and the upper tensile layer 402.

The heat press tool 500 includes a housing 510 having a top section 512 and a base section 514. A lower platen 516 rigidly attaches to the base section 514 and includes a substantially first flat (planar) surface 501, while an upper platen 518 pivotally attaches to the top section 512 of the housing 512 via an elongate actuation handle 520 and includes a substantially second flat (planar) surface 502. The actuation handle 520 has a proximal end pivotally attached to the top section 512 of the housing 510 and a distal end having a gripper portion 522. Accordingly, the upper platen 518 is reciprocally movable by the actuation handle 520 relative to the lower platen 516 to operate the tool 500 between an open position when the upper platen 518 is furthest away from the lower platen 516 and a closed position when the upper platen 518 is vertically aligned and proximate to the lower platen 516 such that the first flat surface 501 and the second flat surface 502 are opposing, and in some instances, contacting one another. In some configurations, the actuation handle 520 is omitted and one or both of the upper and lower platens 516 and 518 move relative to one another between the open and closed positions in a fully automated manner through the use of one or more actuating mechanisms (none shown).

FIG. 3 shows the upper platen 518 including one or more heating elements 530 disposed therein that are operable to selectively raise a temperature of the second flat surface 502. As shown in FIG. 3, such heating elements are not included in the lower platen 516. In other configurations, however, the lower platen 516 may include one or more heating elements 530 for selecting raising a temperature of the first flat surface 501 while the upper platen 518 may also include the heating elements 530 or omit the heating elements 530. While in the closed position, the first and second flat surfaces 501 and 502 of the tool 500 are operative to apply sufficient heat and pressure for joining the first and second polymer sheets 301 and 302 together and, thus, define the peripheral bond 350 of the fluid-filled chamber 300. In some configurations, the tensile element 400 defines a predetermined area 340 (FIG. 4) and is operative to maintain a gap G between the polymer sheets 301 and 302 at the predetermined area 340 such that the sheets 301 and 302 only join together at locations outside of the predetermined area 340. In other configurations, a jig 700 (FIG. 12) is positioned between the first flat surface 501 and the first polymer sheet 301 and the gap G between the sheets 301 and 302 is maintained within an interior void 720 (FIG. 12) defined by the jig 700. In some implementations, the tool 500 includes a power cord 550 configured to provide power to the tool 500 from an external power source (not shown) for energizing the heating elements 530 to heat the second flat surface 501 to a desired temperature. In other implementations, the tool 500 includes an energy storage device (e.g., a battery; not shown) for providing power to energize the heating elements 530. The tool 500 may also include data processing hardware 552 for setting the desired temperature of the second flat surface 501.

Referring to FIGS. 4-9, schematic views of the heat press tool 500 of FIG. 3 are provided and include the lower platen 516 and the upper platen 518 operable between the open and closed positions for joining the first polymer sheet 301 and the second polymer sheet 302 together to define the peripheral bond 350 of the fluid-filled chamber 300. As set forth above, the fluid-filled chamber 300 may be incorporated into the article of footwear 10 of FIGS. 1 and 2 once formed and inflated.

The lower platen 516 includes the substantially first flat surface 501 and the upper platen 518 includes the substantially second flat surface 502 and the one or more heating elements 530 disposed therein for raising the temperature (e.g., heating) the second flat surface 502. The lower platen 516 may additionally or alternatively include heating elements for raising the temperature of the first flat surface 501 without departing from the scope of the present disclosure. In some examples, the lower platen 516 is fixed and the upper platen 518 translates toward the lower platen 516 to close the heat press tool 500 and thereby apply pressure and heat to the first and second polymer sheets 301 and 302 disposed therebetween. In other examples, the lower platen 516 and the upper platen 518 may each translate toward one another or only the lower patent 516 may translate toward the upper platen 518.

Figure 4:
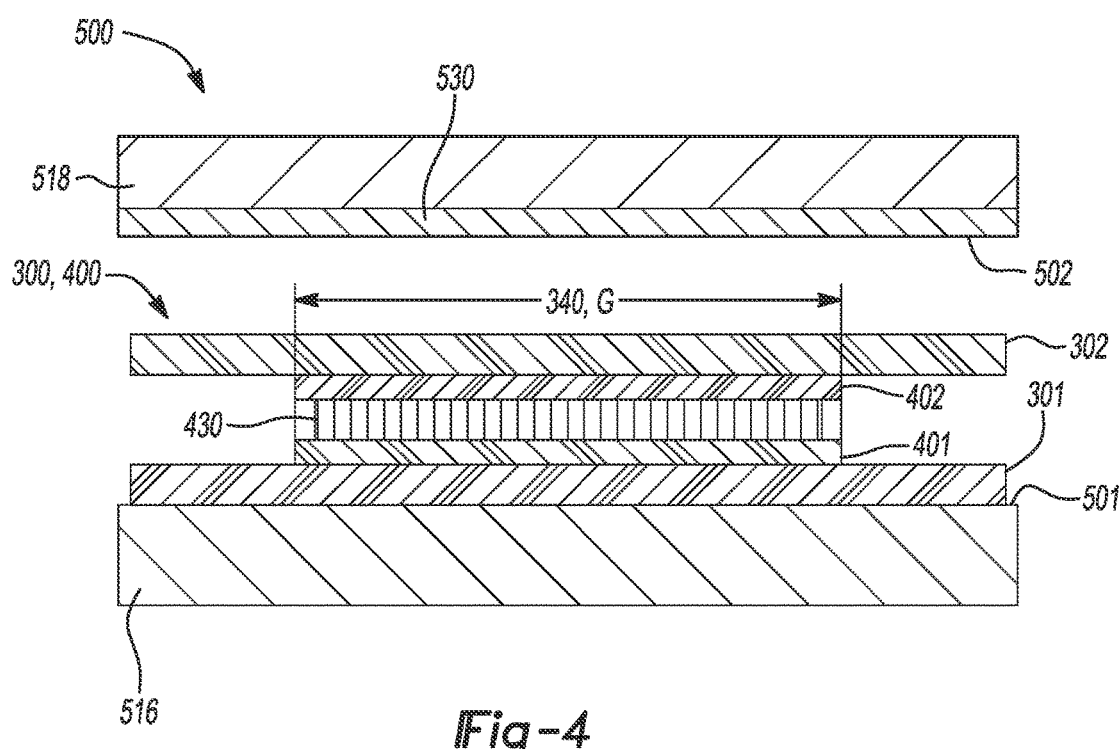
FIG. 4 is a schematic view of the heat press tool of FIG. 3 showing a first polymer sheet positioned on a substantially first flat surface of the lower platen and a second polymer sheet positioned on the first polymer sheet when the heat press tool is in the open position.

FIG. 4 shows the tool 500 open and the first polymer sheet 301 positioned on the substantially first flat surface 501 of the tool 500, the second polymer sheet 302 positioned on the first polymer sheet 301, and the tensile element 400 defining the predetermined area 340 disposed between the first polymer sheet 301 and the second polymer sheet 302. More specifically, the first tensile layer 401 of the tensile element 400 is positioned in contact with the first polymer sheet 301 and the second tensile layer 402 of the tensile element 400 is positioned in contact with the second polymer sheet 302. The tensile members 430 may be disposed between and connecting the tensile layers 401 and 402. As will become apparent, the tensile element 400 is operative to maintain the gap G between the first polymer sheet 301 and the second polymer sheet 302 at the predetermined area 340 such that the first polymer sheet 301 and the second polymer sheet 302 are prevented from joining, or otherwise bonding, to one another at locations within the predetermined area 340. In operation, the upper platen 518 and second flat surface 502 thereof may be moved to the open position in order to expose the first flat surface 501 of the lower platen 516. In some examples, the heating elements 530 begin to heat the second flat surface 502 to a predetermined temperature while the tool 500 is open. As such, the second flat surface 502 may be at a predetermined temperature prior to engaging the second polymer sheet 302.

Figure 5:
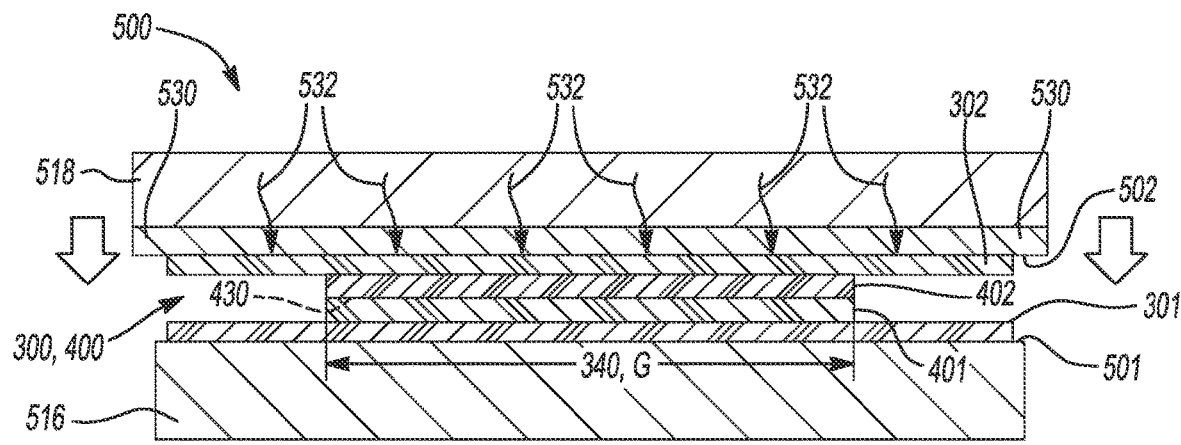
FIG. 5 is a schematic view of the heat press tool of FIG. 3 showing the first polymer sheet and the second polymer sheet positioned between the first flat surface and the second flat surface and the second polymer sheet heated by the second flat surface when the heat press tool is in the closed position.

The tool 500 may be closed by selectively moving the actuation handle 520 to translate the upper platen 518 toward the lower platen 516. FIG. 5 shows the tool 500 closed by moving the second substantially flat surface 502 of the upper platen 518 into contact with the second polymer sheet 302. Moving the second flat surface 502 into contact with the second polymer sheet 302 causes the first polymer sheet 301, the second polymer sheet 302, and the tensile element 400 to compress between the first flat surface 501 and the second flat surface 502 of the heating tool 500. The tensile element 400 is operative to maintain the gap G between the first polymer sheet 301 and the second polymer sheet 302 at the predetermined area 340 while the first polymer sheet 301 and the second polymer sheet 302 contact one another at locations outside of the predetermined area 340. Concurrently, the heating elements 530 associated with the upper platen 518 apply heat 532 to heat the second flat surface 502 of the tool 500 to a predetermined temperature, thereby heating the second polymer sheet 302 in contact therewith. In some examples, heating the second flat surface 502 of the tool 500 includes heating an entire surface of the second flat surface 502. The predetermined temperature includes a temperature suitable for allowing the second polymer sheet 302 to bond with the second tensile layer 402 of the tensile element 400 at the locations within the predetermined area 340, while simultaneously joining with the first polymer sheet 301 at the locations outside of the predetermined area 340 to define the peripheral bond 350 of the chamber 300. In other examples, the lower platen 516 includes heating elements for heating the first flat surface 501 to heat the first polymer sheet 301 in contact therewith to bond with the first tensile layer 401 of the tensile element 400.

Figure 6:
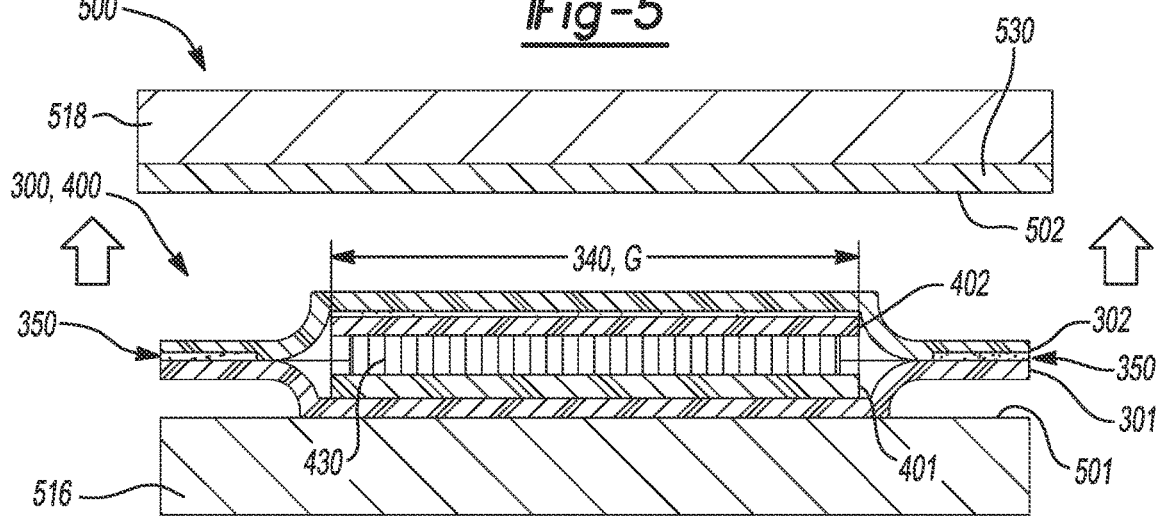
FIG. 6 is a schematic view of the heat press tool of FIG. 3 showing the heat press tool in the open position and the first polymer sheet and the second polymer sheet joined together to define a peripheral bond.
Figure 7:
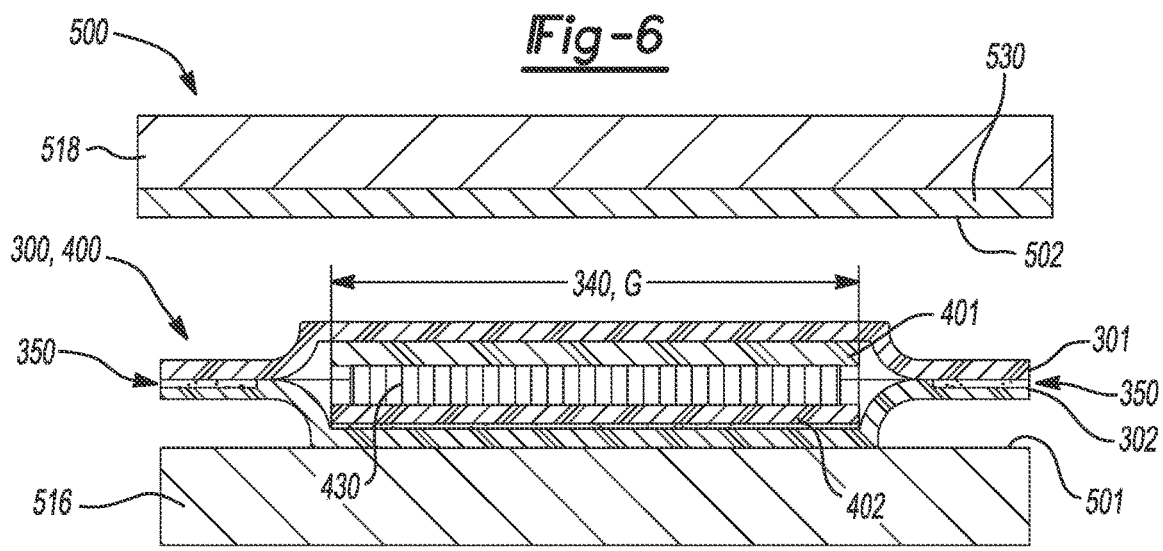
FIG. 7 is a schematic view of the heat press tool of FIG. 3 showing the second polymer sheet positioned on the substantially first flat surface of the lower platen and bonded to a tensile layer of a tensile element with the heat press tool is in the open position.

FIG. 6 shows the heating press tool 500 in the open position by moving the second substantially flat surface 502 of the upper platen 518 away from the second polymer sheet 302 after joining the first polymer sheet 301 and the second polymer sheet 302 to define the peripheral bond 350. The heat applied by the second substantially flat surface 502 while in contact with the second polymer sheet 302 also allows the second polymer sheet 302 to bond to the second tensile layer 402 of the tensile element 400. In some examples, the heat applied by the second substantially flat surface while in contact with the second polymer sheet 302 is also sufficient to allow the first polymer sheet 301 to bond to the first tensile layer 401 of the tensile element 400. In other examples, however, no thermal bonding between the first polymer sheet 301 and the first tensile layer 401 of the tensile element 400 has occurred. Accordingly, the first polymer sheet 301 must also be heated by the second substantially flat surface 502 of the tool 500 while under pressure (e.g., compressed between the two flat surfaces 501 and 502) to bond with the first tensile layer 401 of the tensile element 400. FIG. 7 shows the heating press 500 remaining in the open position and the second polymer sheet 302 now positioned on the first flat surface 501 of the tool 500, thereby permitting the heated second flat surface 502 of the tool 500 to contact the first polymer sheet 302 when the tool 500 moves to the closed position by selectively moving the actuation handle 520 to translate the upper platen 518 toward the lower platen 516.

Figure 8:
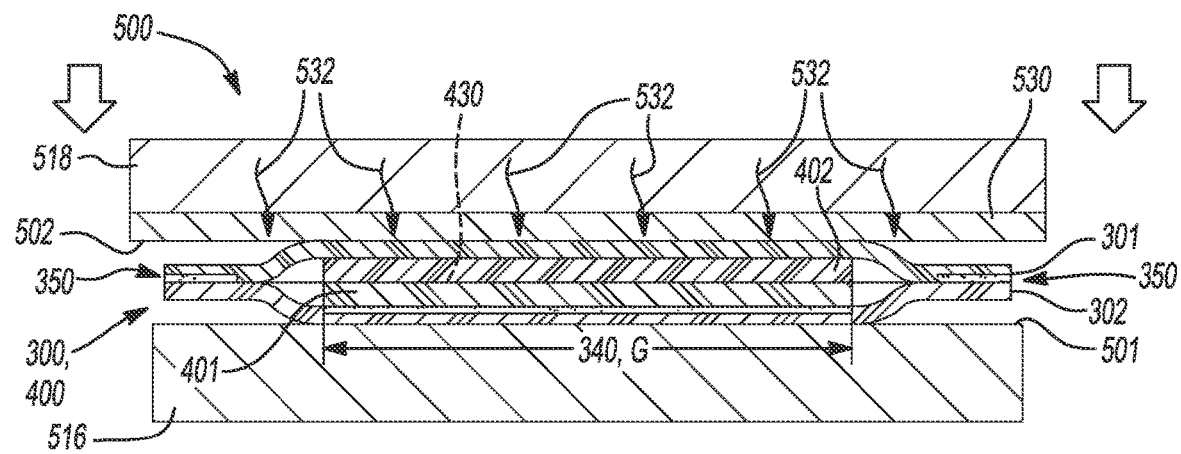
FIG. 8 is a schematic view of the heat press tool of FIG. 3 showing the first polymer sheet and the second polymer sheet positioned between the first flat surface and the second flat surface and the first polymer sheet heated by the second flat surface when the heat press tool is in the closed position.
Figure 9:
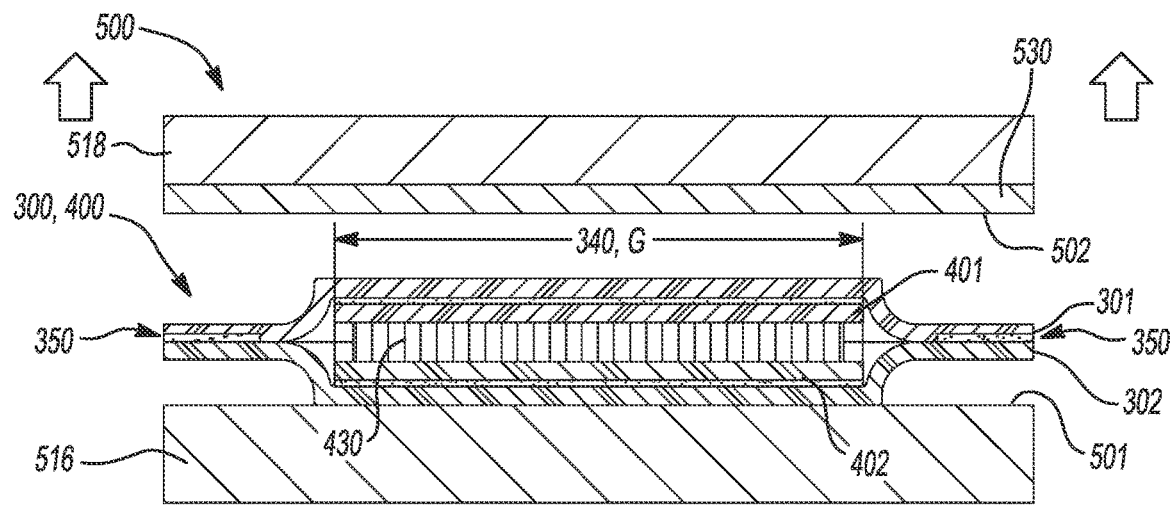
FIG. 9 is a schematic view of the heat press tool of FIG. 3 showing the heat press tool in the open position and the first polymer sheet and the second polymer sheet bonded to respective tensile layers of the tensile element.

FIG. 8 shows the tool 500 in the closed position after moving the second substantially flat surface 502 of the upper platen 518 into contact with the second polymer sheet 302. While the polymer sheets 301 and 302 and the tensile element 400 are compressed between the first flat surface 501 and the second flat surface 502 of the tool 500, the heating elements 530 continue to apply heat 532 for heating the second flat surface 502 to heat the first polymer sheet 301 in contact therewith. Accordingly, the heat 532 applied by the second substantially flat surface 502 while in contact with the first polymer sheet 301 allows the first polymer sheet 301 to bond to the first tensile layer 401 of the tensile element 400. FIG. 9 shows the tool 500 in the open position after moving the second substantially flat surface 502 of the upper platen 518 away from the first polymer sheet 301. Here, the peripheral bond 350 extends around the periphery of the chamber 300 to connect the first polymer sheet 301 (e.g., lower barrier portion 301) to the second polymer sheet 302 (e.g., upper barrier portion). Thereafter, pressurized fluid (e.g., air) may be supplied into an area between the first polymer sheet 301 and the second polymer sheet 302 to inflate the chamber 300 via an inflation port (not shown) inserted between the sheets 301, 302 at a port location along the peripheral bond 350. Once inflated, the inflation port may be closed by applying heat and pressure to the sheets 301, 302 at the port location to once again seal the bond 350. Here, the peripheral bond 350 forms the sidewall 303 extending around the periphery of the chamber 300, while the tensile element 400 is operative to prevent the chamber 300 from expanding outward or otherwise distending due to the pressure of the fluid within the internal cavity of the chamber 300. Namely, the tensile element 400 may limit expansion of the chamber 300 when under pressure to retain an intended shape of surfaces of the barrier portions 301 and 302.

In other configurations, the lower platen 516 also includes heating elements for heating the first flat surface 501 while the second flat surface 502 is simultaneously heated by the illustrated heating elements 530. In these configurations, the heating of both the first and second flat surfaces 501 and 502 allows the first polymer sheet 301 to bond with the first tensile layer 401 and the second polymer sheet 302 to bond with the second tensile layer 402 concurrently without requiring the second flat surface 502 to heat both of the polymer sheets 301 and 302. As such, providing the lower platen 516 with heating elements 530 eliminates the need to rotate/flip the polymer sheets 301 and 302 so that the first polymer sheet 301 can be heated by the second flat surface 502 after the second polymer sheet 302 is heated by the second flat surface 502.

Figure 10:
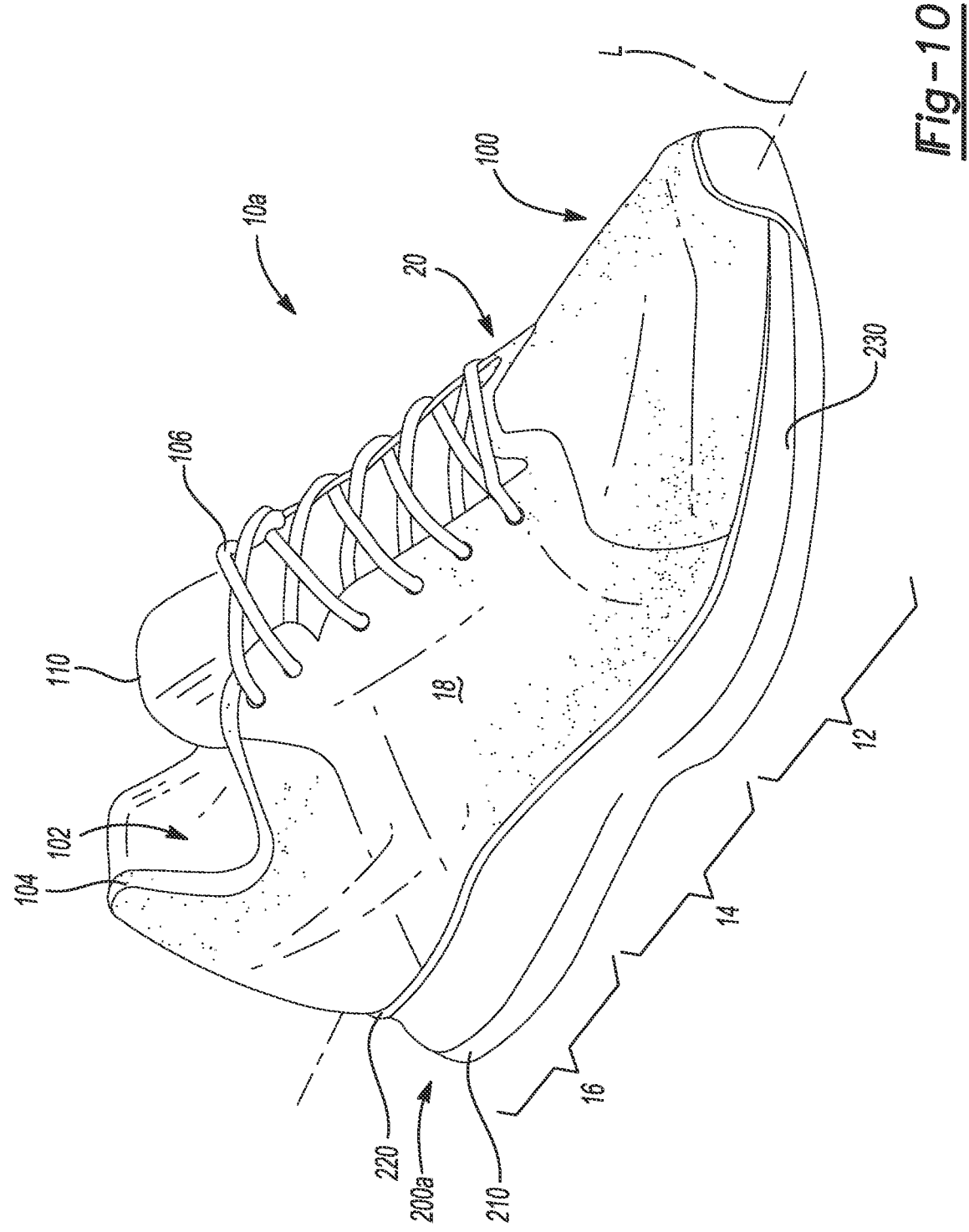
FIG. 10 is a top perspective view of an article of footwear in accordance with principles of the present disclosure.
Figure 11:
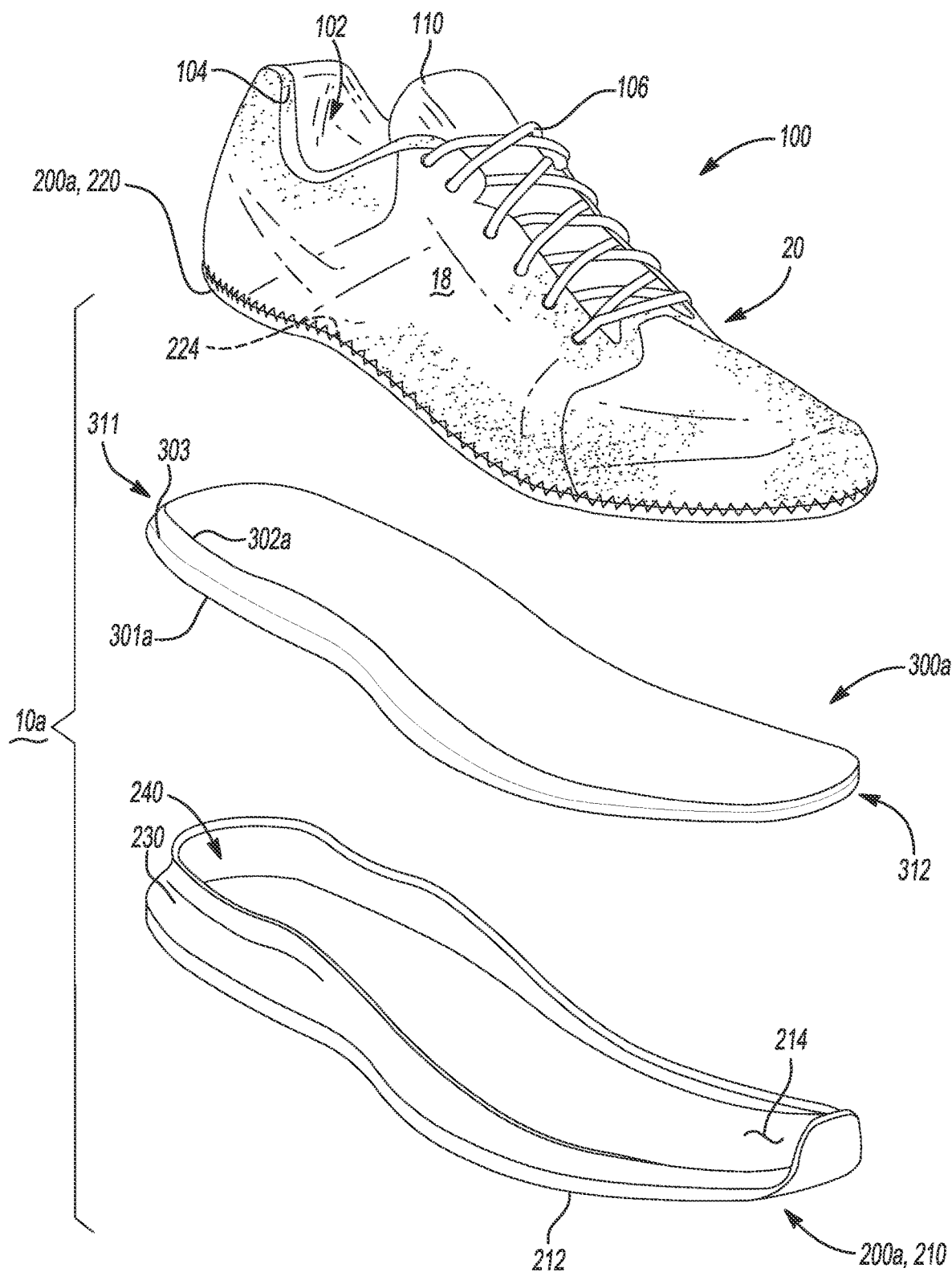
FIG. 11 is an exploded view of the article of footwear of FIG. 10 showing a fluid-filled chamber received within a cavity between an inner surface of an outsole and a bottom surface of a Strobel.

FIGS. 10 and 11 provide an article of footwear 10a that includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a includes the outsole 210 and the strobel 220 arranged in the layered configuration. The sidewall 230 may surround the perimeter of the outsole 210 and may separate the outsole 210 and the strobel 220 to define the cavity 240 therebetween. The outsole 210 includes an inner surface 214 disposed on an opposite side of the outsole 210 than the ground-engaging surface 212. The strobel 220 includes a bottom surface 222 disposed on an opposite side of the strobel 220 than the footbed 224. The bottom surface 222 opposes the inner surface 214 and the sidewall 230 may separate the bottom surface 222 and the inner surface 214 to define a depth of the cavity 240.

In some configurations, the cavity 240 receives a fluid-filled chamber 300a filled with pressurized fluid (e.g., as air, nitrogen, helium, sulfur, hexafluoride, or liquids/gels) to enhance the cushioning characteristics of the footwear 10a in response to ground-reaction forces. The fluid-filled chamber 300a is substantially identical to the fluid-filled chamber 300 of FIGS. 1 and 2 except that the interior cavity of the fluid-filled chamber 300a does not receive the tensile element 400. Accordingly, the chamber 300a may include a lower barrier portion 301a that opposes the outsole 210 and an upper barrier portion 302a disposed on an opposite side of the chamber 300a than the lower barrier portion 301a and opposing the strobel 220. The lower barrier portion 301a may correspond to a first polymer sheet and the upper barrier portion 302 may correspond to a second polymer sheet that joins to the first polymer sheet to define a peripheral bond 350a (FIGS. 16-19) of the chamber 300a. Here, the peripheral bond 350a defines a predetermined area 340a (FIGS. 14-19) associated with the interior cavity that receives and retains the pressurized fluid therein. Accordingly, the peripheral bond 350a forms the sidewall 303 that extends around the periphery of the chamber 300a to connect the lower barrier portion 301a to the upper barrier portion 302a.

FIG. 11 provides an exploded view of the article of footwear 10a showing the fluid-filled chamber 300a retaining the pressurized fluid (e.g., air), the inner surface 214 of the outsole 210, and the bottom surface 222 of the strobel 220. The length of the chamber 300a may extend between the first end 311, disposed proximate to the heel portion 16 of the sole structure 200a, and the second end 312, disposed proximate to the forefoot portion 12 of the sole structure 200a. The chamber 300a may also include a thickness extending substantially perpendicular to the longitudinal axis L of the sole structure 200a and a width extending between the lateral side 18 and the medial side 20. Accordingly, the length, the width, and the thickness of the chamber 300a may substantially occupy the cavity 240 defined by the inner surface 214 and the bottom surface 222 and may extend through the forefoot, mid-foot, and heel portions 12, 14, 16, respectively, of the outsole 210.

As with the fluid-filled chamber 300 of FIGS. 1 and 2, the fluid-filled chamber 300a may be manufactured using a heat press tool 500a (FIGS. 14-19) that applies heat and pressure to join the lower barrier portion 301a (e.g., first polymer sheet) and the upper barrier portion 302a (e.g., second polymer sheet) together to define the peripheral bond 350a of the chamber 300a. In some implementations, the jig 700 defining the interior void 720 is employed to maintain a gap G between the first polymer sheet 301a and the second polymer sheet 302a within the interior void 720. Here, the gap G has the predetermined area 340a that includes a shape defined by the interior void 720 of the jig 700 such that the two polymer sheets 301a and 302a join together at locations outside the predetermined area 340a to define the peripheral bond 350a of the chamber 300a.

Figure 12:
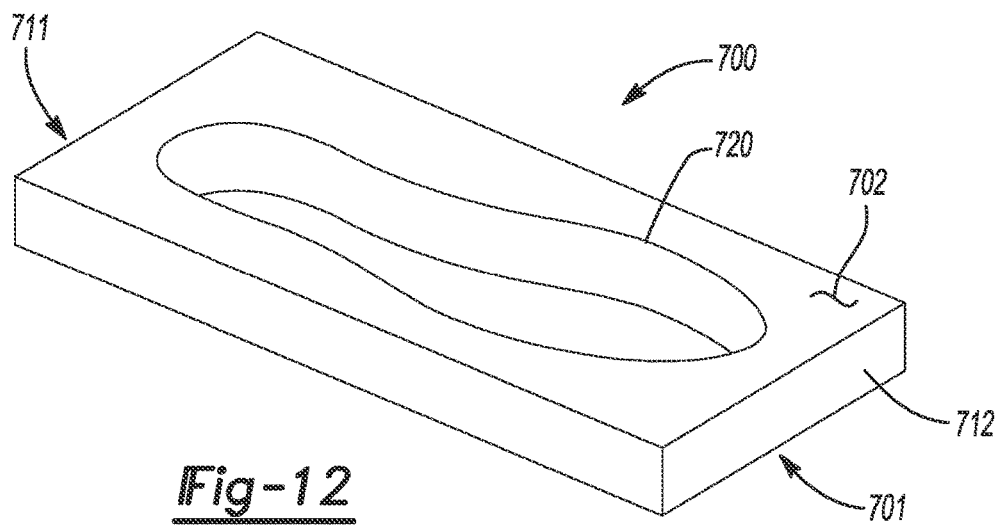
FIG. 12 is a perspective view of a jig defining an interior void in accordance with principles of the present disclosure.
Figure 13:
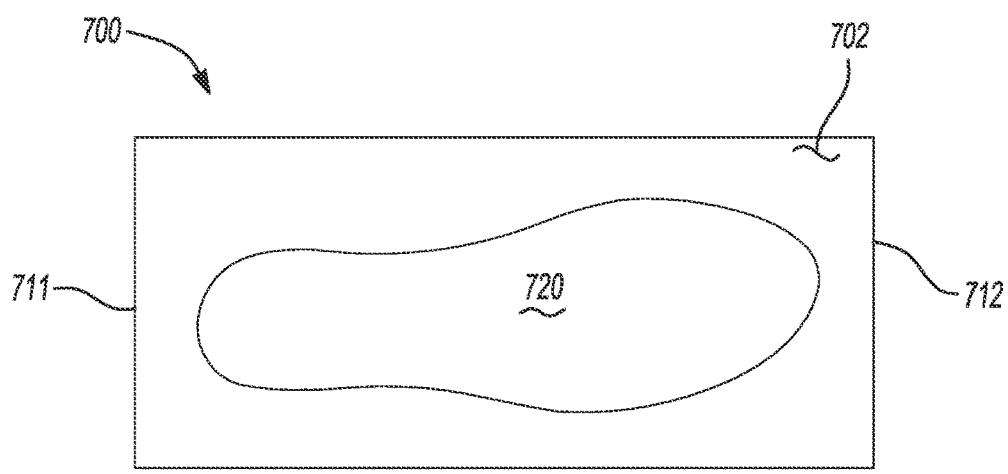
FIG. 13 is a top view of the jig of FIG. 12.

FIGS. 12 and 13 provide the jig 700 for use with the heat press tool 500a (FIGS. 14-19) in maintaining the gap G between the first polymer sheet 301a and the second polymer sheet 302a at the predetermined area 340a when forming the chamber 300a. The interior void 720 defined by the jig 700 is associated with an asymmetrical shape to form the asymmetrical chamber 300a for incorporation into the article of footwear 10a of FIGS. 10 and 11. The jig 700 is substantially solid and is formed from one or more materials that impart properties of structural rigidity and high compressive strength when under load. In some examples, the jig 700 is formed from silicon. In other examples, the jig 700 may be formed from any rigid materials that can withstand high temperatures such as, without limitation, leather, wood, silicon, and plastic. The jig 700 includes a substantially first flat surface 701 and a substantially second flat surface 702 disposed on an opposite side of the jig 700 than the first surface 701. The jig 700 defines a length extending from a first end 711 to a second end 712 in a direction parallel to the first and second surfaces 701 and 702, and a thickness extending between the first and second surfaces 701 and 702. In some implementations, the interior void 720 defined by the jig 700 is formed entirely through the first and second surfaces 701 and 702 of the jig 700.

FIG. 13 provides a top view of the jig 700 showing the interior void 720 defining a shape associated with the predetermined area 340a of the gap G to be maintained between the first polymer sheet 301a and the second polymer sheet 302a. Accordingly, the interior void 720 may define a length slightly less than the lengths of the polymer sheets 301a and 302a such that the gap is maintained within the interior void 720 and the peripheral bond between the polymer sheets 301a and 302a is formed outside of the interior void 720.

Referring to FIGS. 14-19, a heat press tool 500 is provided and includes a lower platen 516 and an upper platen 518 operable between open and closed positions for joining the first polymer sheet 301a and the second polymer sheet 302a together to define the peripheral bond 350a of the fluid-filled chamber 300a for incorporation into the article of footwear 10a of FIGS. 10 and 11. The lower platen 516 includes a substantially first flat surface 501 and the upper platen 518 includes a substantially second flat surface 502. In some implementations, the heating elements 530 are disposed in the upper platen 518 for increasing the temperature (e.g., heating) the second flat surface 502. The lower platen 516 may additionally or alternatively include heating elements for increasing the temperature of the first flat surface 501 without departing from the scope of the present disclosure. In some examples, the lower platen 516 is fixed and the upper platen 518 translates toward the lower platen 516 to close the heat press tool 500 and thereby apply pressure and heat 532 to the first and second polymer sheets 301a and 302a disposed therebetween. In other examples, the lower platen 516 and the upper platen 518 may each translate toward one another or only the lower platen 516 may translate toward the upper platen 518. In some examples, the lower platen 516 includes heating elements to apply heat 532 in addition to, or in lieu of, applying heat 532 from heating elements 530 disposed in the upper platen 518.

Figure 14:
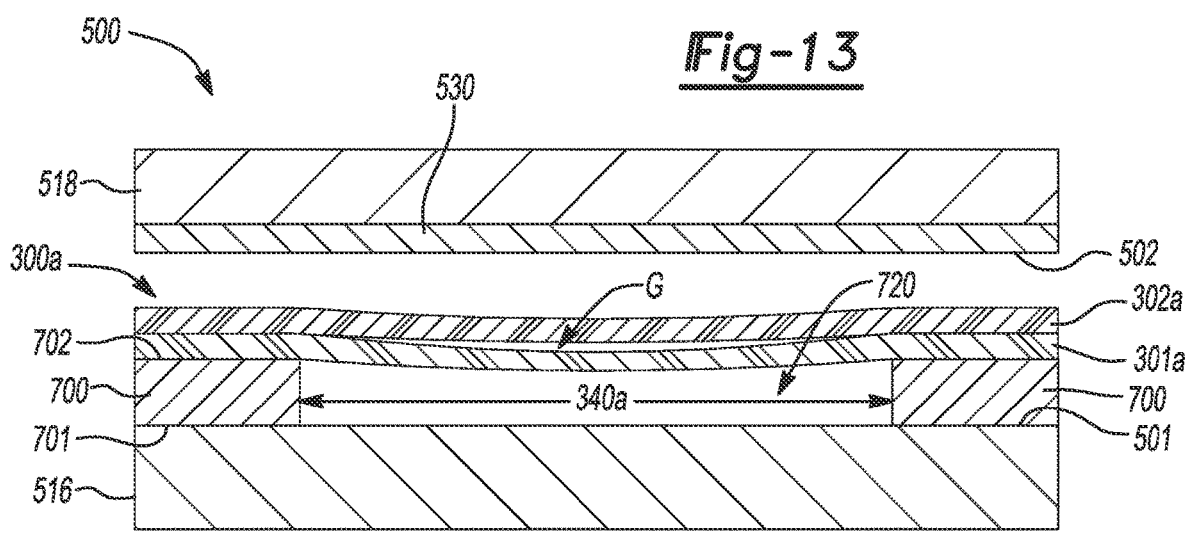
FIG. 14 is a schematic view of a heat press tool showing the jig of FIG. 12 positioned on a substantially first flat surface of the tool, a first polymer sheet positioned on the jig, and a second polymer sheet positioned on the first polymer sheet when the heat press tool is in an open position.

FIG. 14 shows the heat press tool 500 in the open position and the jig 700 positioned in a first position on the substantially first flat surface 501 of the tool 500, the first polymer sheet 301a positioned on the jig 700, and the second polymer sheet 302a positioned on the first polymer sheet 301a. The first position of the jig 700 corresponds to the first flat surface 701 in opposed contact with the first flat surface 501 of the tool 500 and the second flat surface 702 in opposed contact with the first polymer sheet 301a. FIG. 14 shows gravity causing the polymer sheets 301a and 302a to sag relative to the first flat surface 701 at locations within the interior void 720. As will become apparent, the interior void 720 is operative to maintain the gap G between the first polymer sheet 301a and the second polymer sheet 302a within the interior void 720 such that the first polymer sheet 301a and the second polymer sheet 302a are prevented from joining, or otherwise bonding, to one another at the predetermined area 340a including a shape defined by the interior void 720 of the jig 700. In short, the gap G prevents the sheets 301a, 302a from contacting one another and, as such, prevents the sheets 301a, 302a from bonding to one another when heat and pressure are applied by the tool 500. In some examples, the heating elements 530 begin to heat the second flat surface 502 to a predetermined temperature while the tool 500 is open. As such, the second flat surface 502 may be at a predetermined temperature prior to engaging the second polymer sheet 302*a*.

Figure 15:
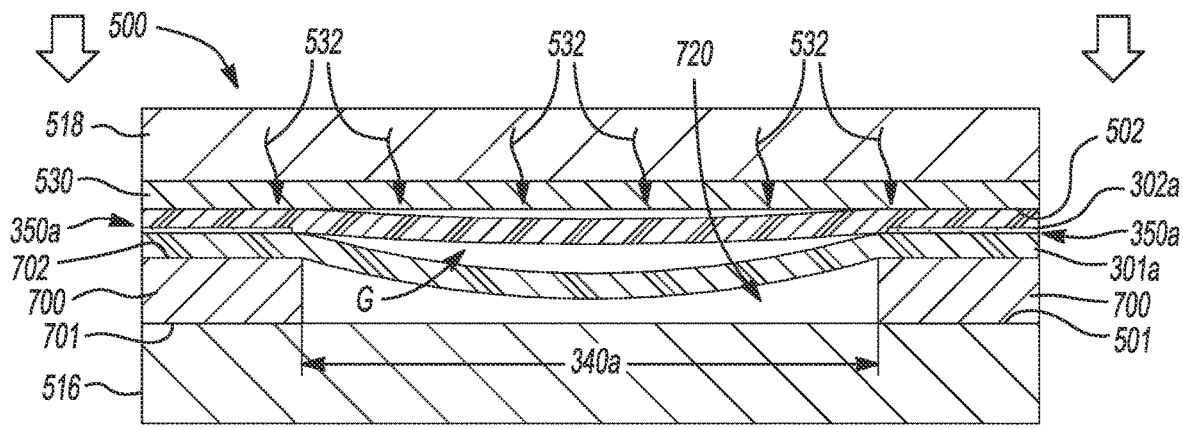
FIG. 15 is a schematic view of the heat press tool of FIG. 14 showing the first polymer sheet and the second polymer sheet maintaining a gap at locations within the interior void of the jig when the heat press tool is in a closed position.

The tool 500 may close by translating the upper platen 518 toward the lower platen 516. FIG. 15 shows the tool 500 closed by moving the second substantially flat surface 502 of the upper platen 518 into contact with the second polymer sheet 302*a*. Moving the second flat surface 502 into contact with the second polymer sheet 302*a* causes the jig 700, the first polymer sheet 301*a*, and the second polymer sheet 302*a* to compress between the first flat surface 501 and the second flat surface 502 of the heat press tool 500. More specifically, the first polymer sheet 301*a* and the second polymer sheet 302*a* compress against one another between the second flat surface 502 of the tool 500 and the jig 700 (e.g., at locations outside the interior void 720), while the gap G is maintained between the two polymer sheets 301*a* and 302*a* within the interior void 720 when the tool 500 is in the closed position. Thus, the interior void 720 defines a shape including the predetermined area 340*a* such that the gap G is maintained between the two polymer sheets 301*a* and 302*a* due to gravity causing the polymer sheets 301*a* and 302*a* to sag within the interior void 720. Concurrently, the heating elements 530 associated with the upper platen 518 heat the second flat surface 502 of the tool 500 to the predetermined temperature to heat the second polymer sheet 302*a* in contact therewith. In some examples, heating the second flat surface 502 of the tool 500 includes heating an entire surface second flat surface 502. The predetermined temperature includes a temperature suitable for allowing the second polymer sheet 302*a* to join with the first polymer sheet 301*a* at locations outside of the interior void 720 defined by the jig 700 to define the peripheral bond 350*a* of the chamber 300*a*. In other examples, the lower platen 516 additionally or alternatively includes heating elements 530 for heating the first flat surface 501 to heat the first polymer sheet 301*a*, as described above with respect to the fluid-filled chamber 300.

Figure 16:
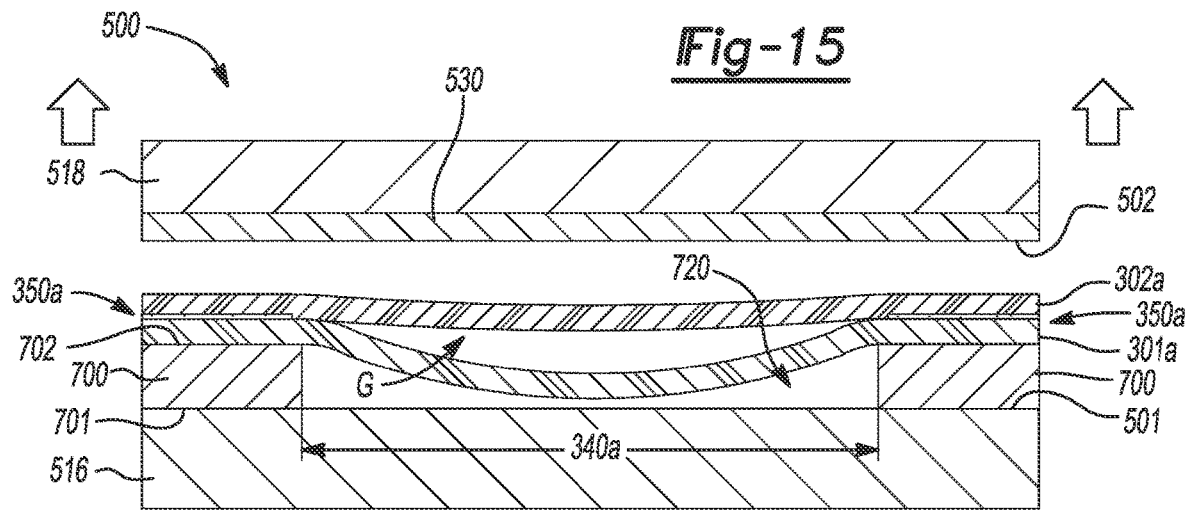
FIG. 16 is a schematic view of the heat press tool of FIG. 14 showing the heat press tool in the open position and the first polymer sheet and the second polymer sheet joined together to define a peripheral bond.
Figure 17:
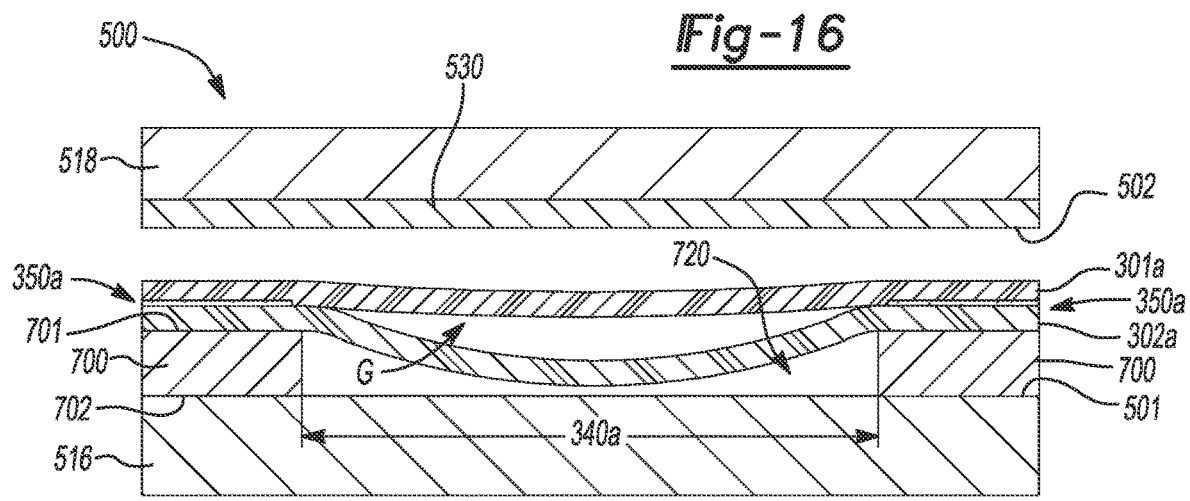
FIG. 17 is a schematic view of the heat press tool of FIG. 14 showing the jig rotated 180° and the second polymer sheet positioned on the jig when the heat press tool is in the open position.

FIG. 16 shows the heat press tool 500 in the open position by moving the second substantially flat surface 502 of the upper platen 518 away from the second polymer sheet 302*a* after joining the first polymer sheet 301*a* and the second polymer sheet 302*a* to define the peripheral bond 350*a* at the locations outside of the interior void 720. The peripheral bond 350*a* may be further strengthened by heating the first polymer sheet 301*a* and applying pressure to compress the first polymer sheet 301*a* against the second polymer sheet 302*a* at the locations outside of the interior void 720. Accordingly, in some optional configurations, the two polymer sheets 301*a* and 302*a* may be rotated 180° (e.g., flipped) so that the first polymer sheet 301*a* can be heated by the substantially second flat surface 502*a* in configurations when the first platen 516 does not include heating elements 530. Moreover, the chamber 300*a* defines an asymmetrical shape corresponding to the outline of a foot. Thus, in order to maintain the gap G between the first polymer sheet 301*a* and the second polymer sheet 302*a* at the locations within the interior void 720, the jig 700 must also be rotated 180° (e.g., flipped) so that the second flat surface 702 of the jig 700 is positioned in contact with the substantially first flat surface 501 of the tool 500 and the second polymer sheet 302*a* is positioned in contact with the first flat surface 701 of the jig 700. FIG. 17 shows the heat press tool 500 remaining in the open position while the jig 700 is positioned in a second position on the first flat surface 501 of the tool 500 after rotating the jig 700 180°. In this view, the second polymer sheet 302*a* is positioned on the jig 700. Here, the second position of the jig 700 corresponds to the second flat surface 702 of the jig 700 now positioned on the first flat surface 501 of the tool 500 to allow the second polymer sheet 302*a* to be positioned in contact with the jig 700. In the example, positioning the second polymer sheet 302*a* in contact with the jig 700 includes positioning the peripheral bond 350*a* on the jig 700.

FIG. 18 shows the tool 500 in the closed position after moving the second substantially flat surface 502 of the upper platen 518 into contact with the first polymer sheet 302*a*. The gap G between the first polymer sheet 301*a* and the second polymer sheet 302*a* is maintained at the locations within the interior void 720 defined by the jig 700. While the polymer sheets 301*a* and 302*a* are compressed between the jig 700 and the second flat surface 502 of the tool 500, the second flat surface 502 heated by the heating elements 530 now heats (via heat 532) the first polymer sheet 301*a* in contact therewith to further strengthen the peripheral bond 350*a* at the locations outside of the interior void 720 defined by the jig 700. In some configurations, a bond inhibitor is applied between the polymer sheets 301*a* and 302*a* within the predetermined area 340*a* to prevent the polymer sheets 301*a* and 302*a* from bonding to each other to create the gap G. The bond inhibitor may include placing a printed pigment-based ink within the predetermined area 340*a* associated with the gap G. For instance, the pigment-based ink may be printed on a sheet of fabric or paper and the sheet may be placed within the predetermined area 340*a*. In some configurations, the bond inhibitor may include spraying or pressing a pigmented-based ink within the predetermined area 340*a*.

In some configurations, the interior cavity of the fluid-filled chamber 300*a* also receives the tensile element 400 of the article of footwear 10 of FIGS. 1-9. Here, the lower tensile layer 401 may attach to the lower barrier portion 301*a*, the upper tensile layer 402 may attach to the upper barrier portion 302*a*, and the plurality of tensile elements 430 may extend between the lower and upper tensile layers 401 and 402, respectively, of the tensile element 400. As with the chamber 300 of FIGS. 1-9, thermobonding may be used to secure the tensile element 400 to the chamber 300*a*, and thereby prevent the chamber 300*a* from expanding outward or otherwise distending due to the pressure of the fluid within the internal cavity of the chamber 300*a*. Namely, the tensile element 400 may limit expansion of the chamber 300*a* when under pressure to retain an intended shape of surfaces of the barrier portions 301*a* and 302*a*.

FIG. 19 shows the heat press tool 500 in the open position after moving the second substantially flat surface 502 of the upper platen 518 away from the first polymer sheet 301*a*. Here, the peripheral bond 350*a* extends around the periphery of the chamber 300*a* to connect the first polymer sheet 301*a* (e.g., lower barrier portion) to the second polymer sheet 302*a* (e.g., upper barrier portion). Thereafter, the pressurized fluid (e.g., air) may be supplied into an area between the first polymer sheet 301*a* and the second polymer sheet 302*a* to inflate the chamber 300*a* in a similar fashion as described above with respect to the fluid-filled chamber 300. Here, the peripheral bond 350*a* forms the sidewall 303 extending around the periphery of the chamber 300*a*. In view of the forgoing, the steps outlined in FIGS. 14-16 where heat 532 is applied directly to the second polymer sheet 302*a* is sufficient to join the two polymer sheets 301*a* and 302*a* together to define the peripheral bond 350*a* when the two polymer sheets 301*a* and 302*a* are compressed together. Thus, the pressurized fluid (e.g., air) may be supplied after joining the first polymer sheet 301*a* and the second polymer sheet 302*a* as outlined in FIGS. 14-16. However, the steps outlined in FIGS. 16-18, that require rotating (e.g., flipping) of both polymer sheets 301a and 302a and the jig 700 180° are optional steps that may serve to further strengthen the peripheral bond 350a therebetween.

FIGS. 20 and 21 provide a jig 700b for use with a heat press tool 500 (FIGS. 22-26) to form a fluid-filled chamber 300b (FIG. 27) having a symmetrical shape. More specifically, the jig 700b defines an interior void 720b including a symmetrical shape for forming the chamber 300b to provide cushioning for a heel of a foot. The chamber 300b may be incorporated into the heel portion 16 of either of the articles of footwear 10, 10a in addition to, or in lieu of, the chambers 300, 300a. Thus, the chamber 300b defines a length that is shorter than a length of the sole structure 200, 200a. Other chambers may be similarly manufactured to reside in the forefoot portion 12, the mid-foot portion 14, or a combination of the heel and mid-foot portions 16, 14, respectively, or the forefoot and mid-foot portions 12, 14, respectively. As with the chambers 300, 300a of FIGS. 1-19, the chamber 300b includes a lower barrier portion 301b (e.g., first polymer sheet), an upper barrier portion 302b, and a peripheral bond 350b (FIGS. 24-26) joining the first and second polymer sheets 301b and 302b to define a sidewall 303b extending around the periphery of the fluid-filled chamber 300b. As with the jig 700 of FIGS. 12 and 13, the jig 700b is substantially solid and formed from the one or more materials that impart properties of structure rigidity and high compressive strength when under load, e.g., the jig 700b may be formed from silicon or wood. The jig 700b includes a substantially first flat surface 701b and a substantially second flat surface 702b disposed on an opposite side of the jig 700b than the first surface 701b. The jig 700b defines a length extending from a first end 711b to a second end 712b in a direction substantially parallel to the first and second surfaces 701b and 702b, and a thickness extending between the first and second surfaces 701b and 702b. In some implementations, the interior void 720b defined by the jig 700b is formed entirely through the first and second surfaces 701b and 702b of the jig 700b.

FIG. 21 provides a top view of the jig 700b showing the interior void 720b defining a shape that is symmetrical about a longitudinal axis L of the jig 700b and associated with a predetermined area 340b (FIG. 22) of a gap G (FIG. 22) to be maintained between the first polymer sheet 301b and the second polymer sheet 302b. Accordingly, the interior void 720b may define a length slightly less than the lengths of the polymer sheets 301b and 302b such that the gap G is maintained within the interior void 720 and the peripheral bond 350b between the polymer sheets 301b and 302b is formed at locations outside of the interior void 720b.

Referring to FIGS. 22-26, the heat press tool 500 is provided and includes a lower platen 516 and an upper platen 518 operable between open and closed positions for joining the first polymer sheet 301b and the second polymer sheet 302b together to define the peripheral bond 350b of the fluid-filled chamber 300b (FIG. 27) for incorporation into the heel region 16 of an article of footwear 10, 10a. As with the heat press tools 500 of FIGS. 3-19, the lower platen 516 of the heat press tool 500 includes a substantially first flat surface 501 and the upper platen 518 of the heat press tool 500 includes a substantially second flat surface 502. In some implementations, the heating elements 530 are disposed in the upper platen 518 for increasing the temperature (e.g., heating) of the second flat surface 502. The lower platen 516 may additionally or alternatively include heating elements for increasing the temperature of the first flat surface 501 without departing from the scope of the present disclosure.

In some examples, the lower platen 516 is fixed and the upper platen 518 translates toward the lower platen 516 to close the heat press tool 500 and thereby apply pressure and heat to the first and second polymer sheets 301b and 302b disposed therebetween. In other examples, the lower platen 516 and the upper platen 518 may each translate toward one another or only the lower patent 516 may translate toward the upper platen 518.

Figure 22:
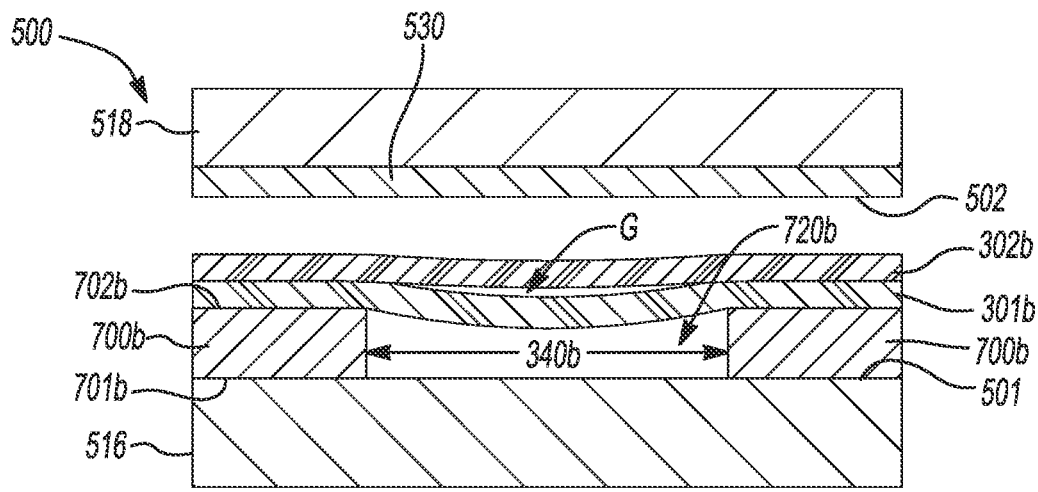
FIG. 22 is a schematic view of a heat press tool showing the jig of FIG. 20 positioned on a substantially first flat surface of the tool, a first polymer sheet positioned on the jig, and a second polymer sheet positioned on the first polymer sheet when the heat press tool is in an open position.

FIG. 22 shows the heat press tool 500 in the open position and the jig 700b positioned in the first position on the first flat surface 501 of the tool 500, the first polymer sheet 301b positioned on the jig 700b, and the second polymer sheet 302b positioned on the first polymer sheet 301b. The first position of the jig 700b corresponds to the first flat surface 701b in opposed contact with the first flat surface 501 of the tool 500 and the second flat surface 702b in opposed contact with the first polymer sheet 301b. FIG. 22 shows gravity causing the polymer sheets 301b and 302b to sag relative to the first flat surface 701b at locations within the interior void 720b. As with the interior void 720 defined by the jig 700 of FIGS. 12-19, the interior void 720b is operative to maintain the gap G between the first polymer sheet 301b and the second polymer sheet 302b within the interior void 720b such that the first polymer sheet 301b and the second polymer sheet 302b are prevented from joining, or otherwise bonding, to one another at a predetermined area 340b including a shape defined by the interior void 720b of the jig 700b. In some examples, the heating elements 530 begin to heat the second flat surface 502 to a predetermined temperature while the tool 500 is open. As such, the second flat surface 502 may be at a predetermined temperature prior to engaging the second polymer sheet 302b.

Figure 23:
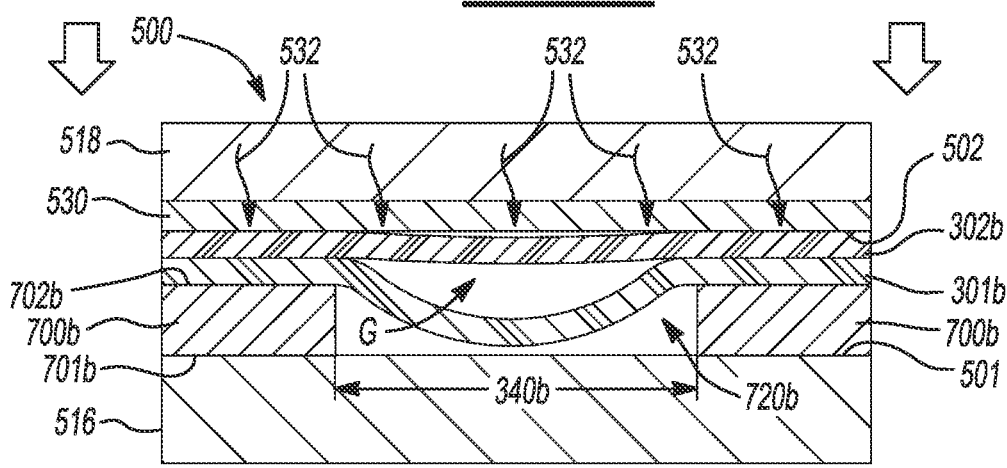
FIG. 23 is a schematic view of the heat press tool of FIG. 22 showing the first polymer sheet and the second polymer sheet maintaining a gap at locations within the interior void of the jig when the heat press tool is in a closed position.

The tool 500 may closed by translating the upper platen 518 toward the lower platen 516. FIG. 23 shows the tool 500 being closed by moving the second substantially flat surface 502 of the upper platen 518 into contact with the second polymer sheet 302b. Moving the second flat surface 502 into contact with the second polymer sheet 302b causes the jig 700b, the first polymer sheet 301b, and the second polymer sheet 302b to compress between the first flat surface 501 and the second flat surface 502 of the heating tool 500. More specifically, the first polymer sheet 301b and the second polymer sheet 302b compress against one another between the second flat surface 502 of the tool 500 and the jig 700b (e.g., at locations outside the interior void 720b), while the gap G is maintained between the two polymer sheets 301a and 302b at the predetermined area 340b within the interior void 720b when the tool 500 is in the closed position. Thus, the interior void 720b defines a shape including the predetermined area 340b such that the gap G is maintained between the two polymer sheets 301b and 302b do to gravity causing the polymer sheets 301b and 302b to sag within the interior void 720b. Concurrently, the heating elements 530 associated with the upper platen 518 apply heat 532 to the second flat surface 502 of the tool 500 to a predetermined temperature to heat the second polymer sheet 302b in contact therewith. In some examples, heating the second flat surface 502 of the tool 500 includes heating the entire second flat surface 502. The predetermined temperature includes a temperature suitable for allowing the second polymer sheet 302b to join with the first polymer sheet 301b at locations outside of the interior void 720b defined by the jig 700b to define the peripheral bond 350b of the chamber 300b. In other examples, the lower platen 516 includes heating elements 530 for heating the first flat surface 501 to heat the first polymer sheet 301b simultaneously with the second polymer sheet 302b.

Figure 24:
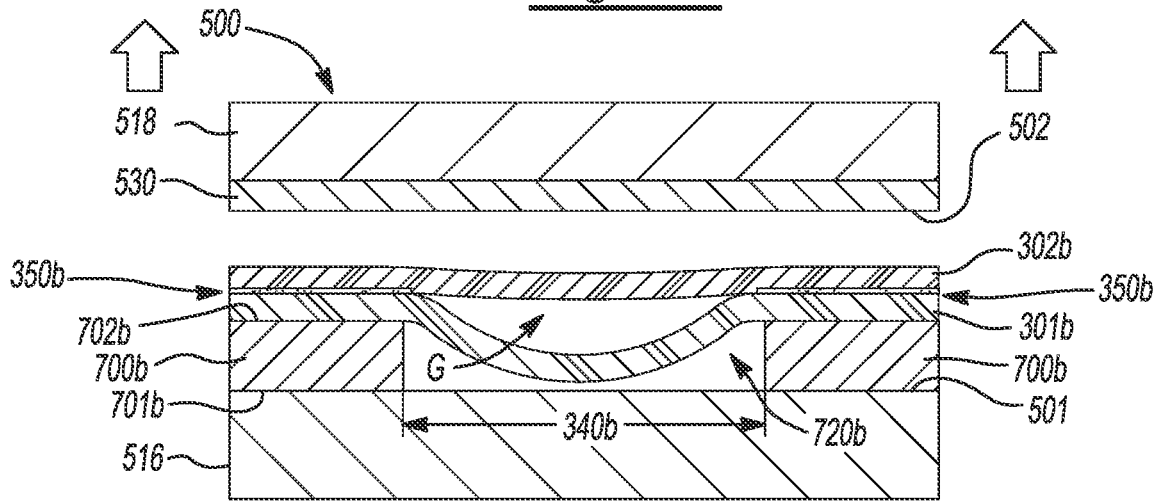
FIG. 24 is a schematic view of the heat press tool of FIG. 22 showing the heat press tool in the open position and the first polymer sheet and the second polymer sheet joined together to define a peripheral bond.
Figure 25:
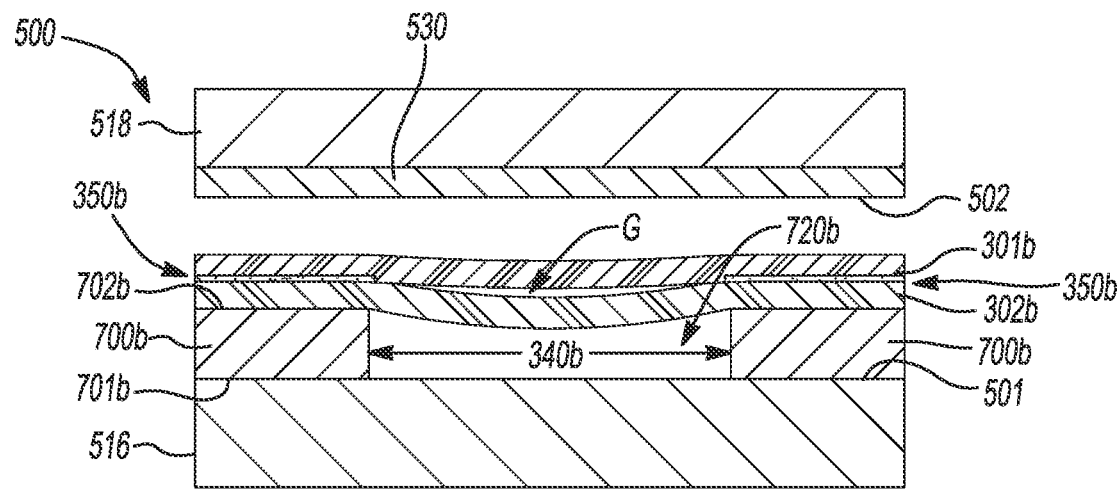
FIG. 25 is a schematic view of the heat press tool of FIG. 22 showing the second polymer sheet positioned on the jig when the heat press tool is in the open position.

FIG. 24 shows the heating press tool 500 in the open position by moving the second substantially flat surface 502 of the upper platen 518 away from the second polymer sheet 302*b* after joining the first polymer sheet 301*b* and the second polymer sheet 302*b* to define the peripheral bond 350*b* at the locations outside of the interior void 720*b* defined by the jig 700*b*. The peripheral bond 350*b* may be further strengthened by heating the first polymer sheet 301*b* and applying pressure to compress the first polymer sheet 301*b* against the second polymer sheet 302*b* at the locations outside of the interior void 720*b*. Accordingly, the two polymer sheets 301*b* and 302*b* may be rotated 180° (e.g., flipped) so that the first polymer sheet 301*b* can be heated by the substantially second flat surface 502 in configurations when the first platen 516 does not include heating elements. As the shape defined by the interior void 720*b* of the jig 700*b* is symmetrical, the jig 700*b* may remain in the first position on the first flat surface 501 of the tool 500 while the second polymer sheet 302*b* is positioned in contact with the first flat surface 701*b* of the jig 700*b*. FIG. 25 shows the heating press tool 500 remaining in the open position while the jig 700*b* remains positioned in the first position on the first flat surface 501 of the tool 500 after the second polymer sheet 302*b* is positioned on the jig 700*b* underneath the first polymer sheet 301*b*. In the example, positioning the second polymer sheet 302*b* in contact with the jig 700*b* includes positioning the peripheral bond 350*b* on the jig 700*b*.

Figure 26:
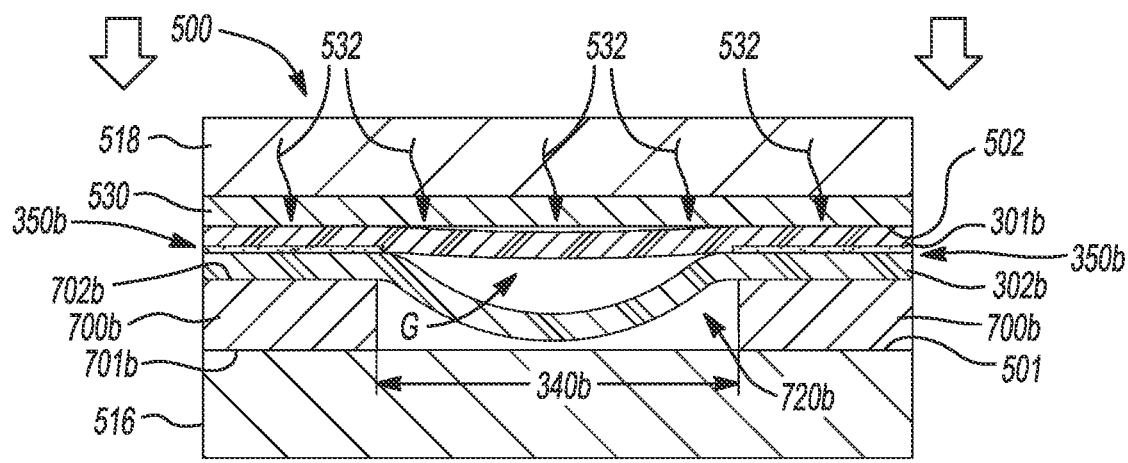
FIG. 26 is a schematic view of the heat press tool of FIG. 22 showing the first polymer sheet and the second polymer sheet maintaining the gap at locations within the interior void of the jig when the heat press tool is in the closed position.

FIG. 26 shows the tool 500 in the closed position after moving the second substantially flat surface 502 of the upper platen 518 into contact with the first polymer sheet 301*b*. The gap G between the first polymer sheet 301*b* and the second polymer sheet 302*b* is maintained at the locations within the interior void 720*b* defined by the jig 700*b*. While the polymer sheets 301*b* and 302*b* are compressed between the jig 700*b* and the second flat surface 502 of the tool 500, the second flat surface 502 heated by the heating elements 530 now applies the heat 532 to the first polymer sheet 301*b* in contact therewith to further strengthen the peripheral bond 350*b* at the locations outside of the interior void 720*b* defined by the jig 700*b*.

Figure 27:
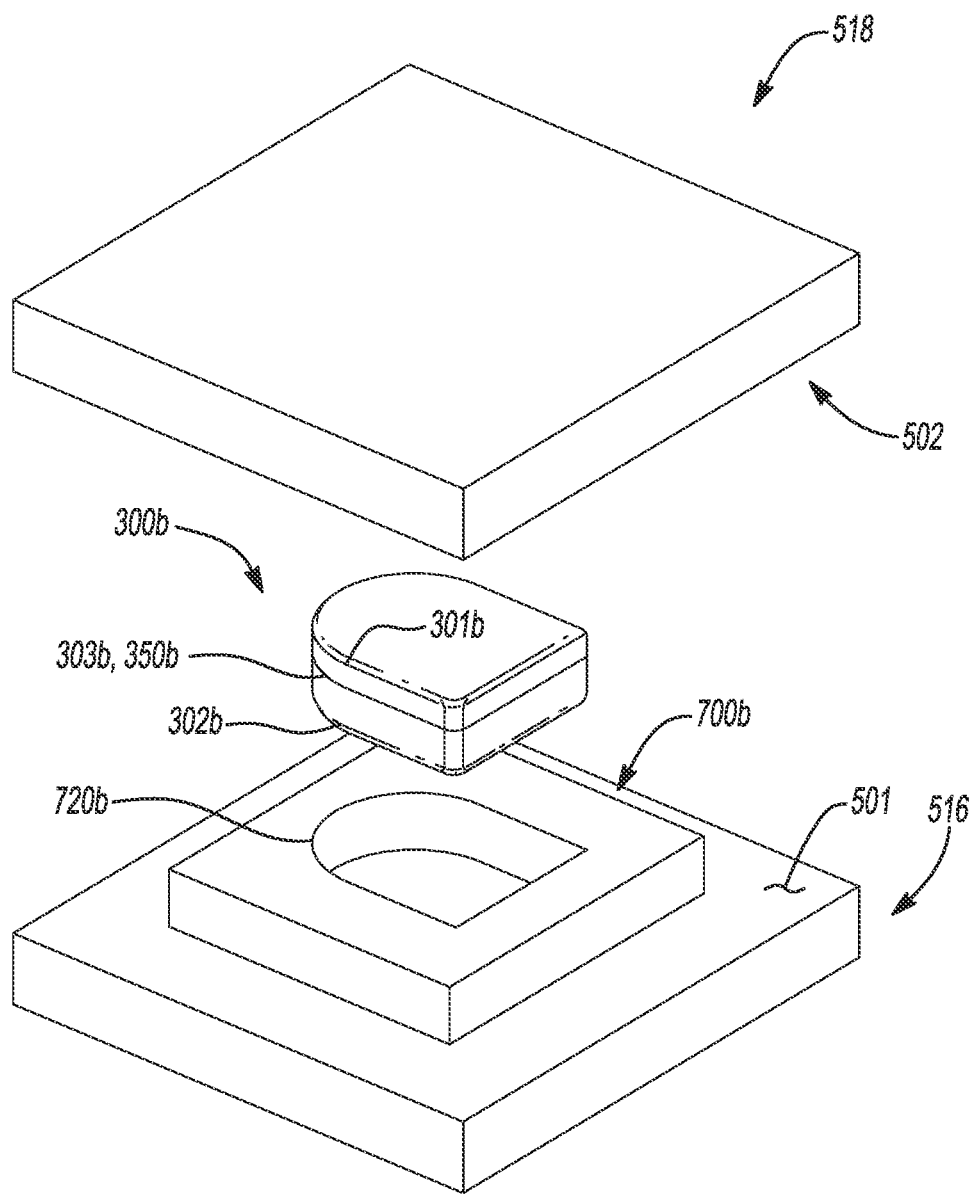
FIG. 27 is a perspective view of the heat press tool of FIG. 22 showing the heat press tool in the open position after forming the fluid-filled chamber by joining the first polymer sheet to the second polymer sheet to define the peripheral bond.

FIG. 27 provides a perspective view of the heating press tool 500 in the open position after forming the chamber 300*b* by joining the first polymer sheet 301*b* to the second polymer sheet 302*b* at the peripheral bond 350*b*. Here, the peripheral bond 350*b* extends around the periphery of the chamber 300*b* to connect the first polymer sheet 301*b* (e.g., lower barrier portion) to the second polymer sheet 302*b* (e.g., upper barrier portion). Thereafter, pressurized fluid (e.g., air) may be supplied into an area between the first polymer sheet 301*b* and the second polymer sheet 302*b* to inflate the chamber 300*b*, in the manner described above with respect to the fluid-filled chamber 300. Here, the peripheral bond 350*b* forms the sidewall 303*b* extending around the periphery of the chamber 300*b*. Accordingly, the fluid-filled chamber 300*b* may be incorporated into any of the articles of footwear 10, 10*a* to provide cushioning for the foot in the heel portion 16.

Figure 30:
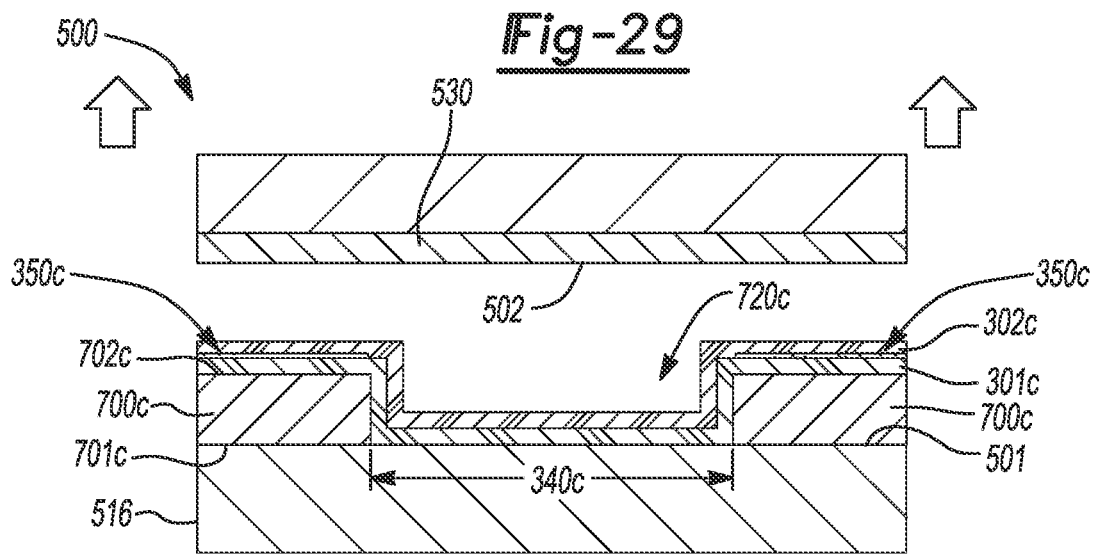
FIG. 30 is a schematic view of the heat press tool of FIG. 28 showing the heat press tool in the open position and the first thermoformed polymer sheet and the second thermoformed polymer sheet joined together to define a peripheral bond.
Figure 31:
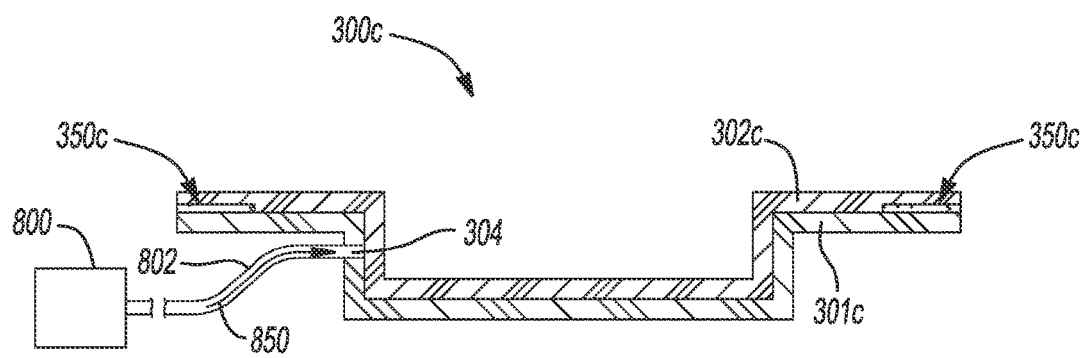
FIG. 31 is schematic view of a chamber formed by joining the first thermoformed polymer sheet to the second thermoformed polymer sheet to define the peripheral bond and a fluid source configured to supply pressurized fluid into the chamber.
Figure 32:
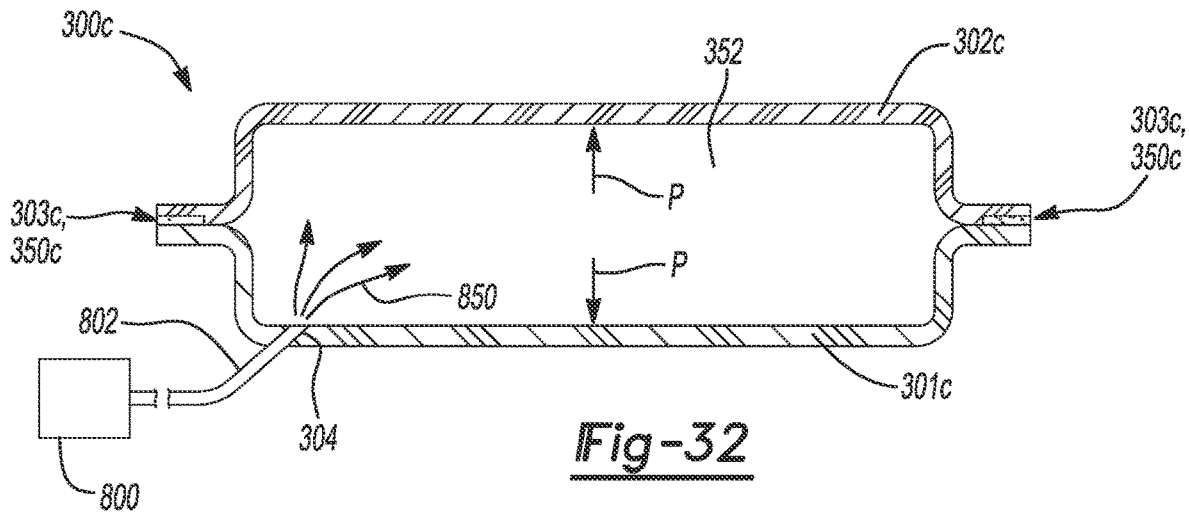
FIG. 32 is a schematic view of the fluid source of FIG. 31 inflating the chamber with pressurized fluid.
Figure 33:
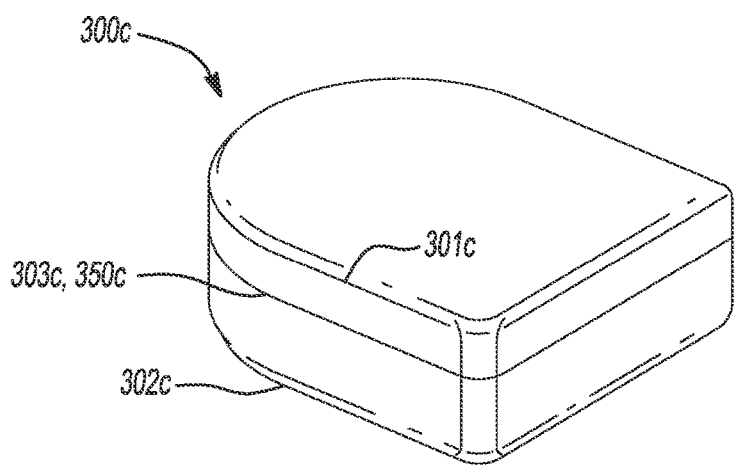
FIG. 33 is a perspective view of the fluid-filled chamber of FIG. 32 showing the first polymer sheet and the second polymer sheet joined together to define the peripheral bond.

Referring to FIGS. 28-33, in some implementations, a first thermoformed polymer sheet 301*c* and a second thermoformed polymer sheet 302*c* join together at a peripheral bond 350*d* to form a fluid-filled chamber 300*c* (FIG. 32). For instance, the chamber 300*c* may be incorporated into the heel portion 16 of either of the articles of footwear 10, 10*a* in addition to, or in lieu of, the chambers 300, 300*a*. The heat press tool 500 is provided and includes a lower platen 516 and an upper platen 518 operable between open and closed positions. The lower platen 516 and upper platen 518 may be used to join the first thermoformed polymer sheet 301*c* and the second thermoformed polymer sheet 302*c* together by defining a peripheral bond 350*c* of the fluid-filled chamber 300*c* (FIG. 33). Once formed, the fluid-filled chamber 300*c* may be incorporated into an article of footwear 10, 10*a*. The sheets 301*c* and 302*c* may be thermoformed to define a shape of the fluid-filled chamber 300*c*. As with the heat press tools 500 of FIGS. 3-19 and 22-26, the lower platen 516 of the heat press tool 500 includes a substantially first flat surface 501 and the upper platen 518 of the heat press tool 500 includes a substantially second flat surface 502. In some implementations, the heating elements 530 are disposed in the upper platen 518 for increasing the temperature (e.g., heating) of the second flat surface 502. The lower platen 516 may additionally or alternatively include heating elements for increasing the temperature of the first flat surface 501 without departing from the scope of the present disclosure. In some examples, the lower platen 516 is fixed and the upper platen 518 translates toward the lower platen 516 to close the heat press tool 500 and thereby apply pressure and heat to the first and second thermoformed polymer sheets 301*c* and 302*c* disposed therebetween. In other examples, the lower platen 516 and the upper platen 518 may each translate toward one another or only the lower platen 516 may translate toward the upper platen 518.

Figure 28:
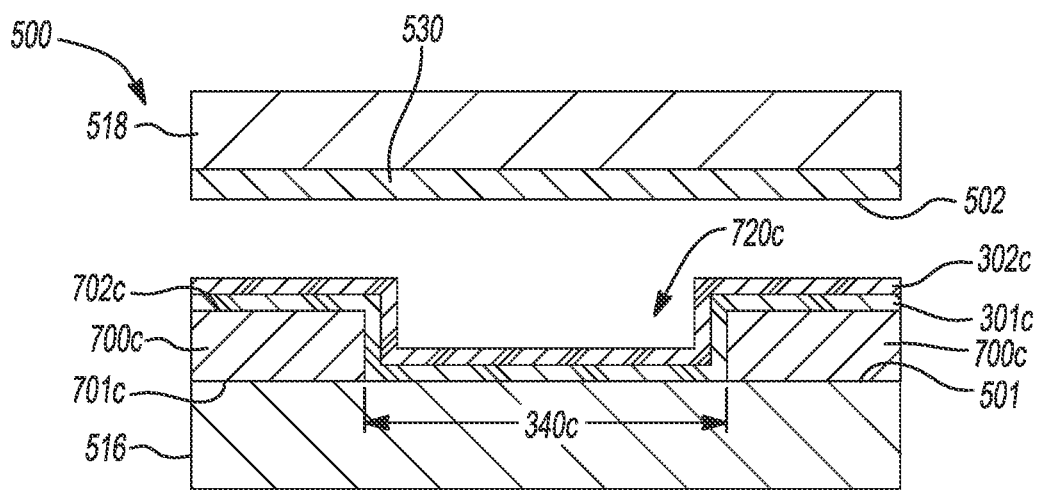
FIG. 28 is a schematic view of a heat press tool showing a jig positioned on a substantially first flat surface of the jig, a first thermoformed polymer sheet positioned on the jig, and a second thermoformed polymer sheet positioned on the first thermoformed polymer sheet when the heat press tool is in an open position.

FIG. 28 shows the heat press tool 500 in the open position and a jig 700*c* positioned on the first flat surface 501 of the tool 500, the first thermoformed polymer sheet 301*c* positioned on the jig 700*c*, and the second thermoformed polymer sheet 302*c* positioned on the first polymer sheet 301*c*. The jig 700*c* includes a first flat surface 701*c* in opposed contact with the first flat surface 501 of the tool 500 and a second flat surface 702*c* in opposed contact with the first thermoformed polymer sheet 301*c*. The jig 700*c* defines an interior void 720*c* that may accommodate the surface profile of the first thermoformed polymer sheet 301*c* and the surface profile of the second thermoformed polymer sheet 302*c* may nest with the first thermoformed polymer sheet 301*c* within the interior void 720*c*. In some examples, the polymer sheet 302*c* is not thermoformed and is simply positioned on top of the first thermoformed polymer sheet 301*c*, whereby gravity causes the second polymer sheet 302*c* to sag relative to the first flat surface 701*c* at locations within the interior void 720*c*. In some examples, the polymer sheets 301*c* and 302*c* are thermoformed to include shapes that are curved or more arcuate. The interior void 720*c* compensates for a thickness or depth of the chamber 300*c* within a predetermined area 340*c* where the thermoformed polymer sheets 301*c* and 302*c* are prevented from joining, or otherwise, bonding to one another. In some examples, the heating elements 530 begin to heat the second flat surface 502 to a predetermined temperature while the tool 500 is open. As such, the second flat surface 502 may be at a predetermined temperature prior to engaging the second thermoformed polymer sheet 302*c*. The jig 700*c* may define the interior void 720*c* having a symmetrical shape to form the fluid-filled chamber 300*c* (FIG. 33) having a corresponding symmetrical shape to provide cushioning for a heel of a foot. In other examples, the jig 700*c*, the heat press tool 500, and the use of at least one thermoformed polymer sheets 301*c* and 302*c* may form a fluid-filled chamber having a shape (e.g., asymmetrical) substantially identical to the fluid-filled chambers 300, 300*a*.

Figure 29:
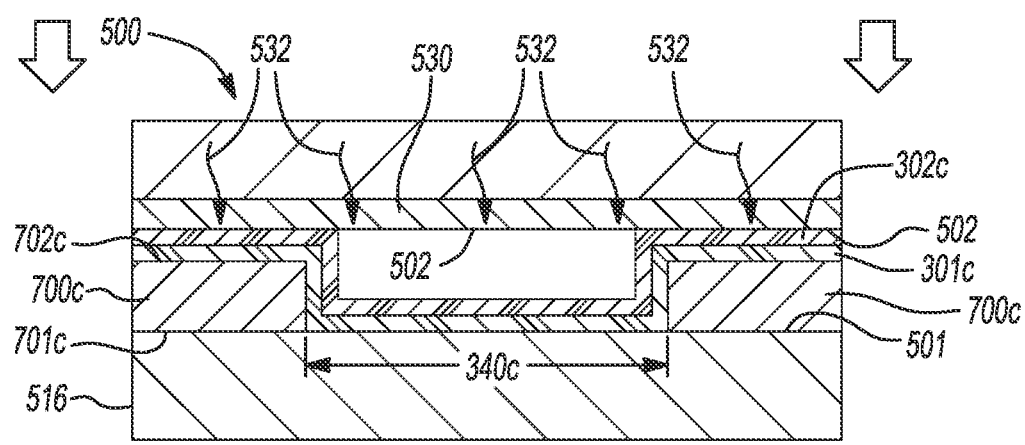
FIG. 29 is a schematic view of the heat press tool of FIG. 28 showing the first thermoformed polymer sheet and the second thermoformed polymer sheet nested within an interior void of the jig when the heat press tool is in a closed position.

The tool 500 may be closed by translating the upper platen 518 toward the lower platen 516. FIG. 29 shows the tool 500 being closed by moving the second substantially flat surface 502 of the upper platen 518 into contact with the second thermoformed polymer sheet 302c. Moving the second flat surface 502 into contact with the second thermoformed polymer sheet 302c causes the jig 700c, the first thermoformed polymer sheet 301c, and the second thermoformed polymer sheet 302c to compress between the first flat surface 501 and the second flat surface 502 of the heating tool 500. More specifically, the first thermoformed polymer sheet 301c and the second thermoformed polymer sheet 302c compress against one another between the second flat surface 502 of the tool 500 and the jig 700c (e.g., at locations outside the interior void 720c), while the portions of the two polymer sheets 301c and 302c within predetermined area 340c that are not to be joined/bonded nest within the interior void 720c when the tool 500 is in the closed position. Concurrently, the heating elements 530 associated with the upper platen 518 apply heat 532 to the second flat surface 502 of the tool 500 to a predetermined temperature to heat the second thermoformed polymer sheet 302c in contact therewith. In some examples, heating the second flat surface 502 of the tool 500 includes heating the entire second flat surface 502. The predetermined temperature includes a temperature suitable for allowing the second thermoformed polymer sheet 302c to join with the first thermoformed polymer sheet 301c at locations outside of the interior void 720c defined by the jig 700c to define the peripheral bond 350c of the chamber 300c.

FIG. 30 shows the heating press tool 500 in the open position by moving the second substantially flat surface 502 of the upper platen 518 away from the second thermoformed polymer sheet 302c after joining the first thermoformed polymer sheet 301c and the second thermoformed polymer sheet 302c to define the peripheral bond 350c at the locations outside of the interior void 720c defined by the jig 700c. Conversely to the peripheral bonds 350, 350a, 350b of FIGS. 1-27, the peripheral bond 350c may form an offset seam located around the peripheral edges of the sheets 301c and 302c.

FIG. 31 shows the first and second thermoformed polymer sheets 301c and 302c removed from the tool 500 after forming the peripheral bond 350c at the locations outside the predetermined area 340c. Here, the chamber 300c is deflated. In some examples, one of the thermoformed polymer sheets 301c and 302c defines a port 304 operative to fluidly couple the chamber 300c to a fluid source 800 containing a pressurized fluid (e.g., air) 850. In the example shown, the port 304 receives a conduit 802 extending from the fluid source 800 to supply the pressurized fluid 850 into the port 304 to inflate the chamber 300c.

FIG. 32 shows the fluid source 800 inflating the chamber 300c by delivering the pressurized fluid 850 through the port 304 via the conduit 802 and into an internal cavity between the first and second thermoformed polymer sheets 301c and 302c. The peripheral bond 350c seals the chamber 300c and allows pressure P within the internal cavity 352 to increase. Here, the pressure P causes inversion of the second thermoformed polymer sheet 302c such that the thermoformed polymer sheets 301c and 302c expand away from one another as the chamber 300c inflates. Here, the peripheral bond 350c forms the sidewall 303c extending around the periphery of the chamber 300c. FIG. 33 provides a perspective view of the chamber 300c formed after inflating the chamber 300c and sealing the port 304. Here, the chamber 300c may be incorporated into the heel portion 16 of any of the articles of footwear 10, 10a. The peripheral bond 350c associated with the offset seam forms the sidewall 303c extending around the periphery of the chamber 300c. In other configurations, the jig 700c, the heat press tool 500, and the use of at least one thermoformed polymer sheets 301c and 302c may form a fluid-filled chamber having any shape suitable to provide cushioning for the foot in at least one of the forefoot, mid-foot, and heel portions 12, 14, 16, respectively, of either of the articles of footwear 10, 10a.

The following Clauses provide configurations for forming a chamber described above.

Clause 1: A method of forming a chamber, the method comprising positioning a first polymer sheet on a substantially first flat surface of a tool, positioning a second polymer sheet on the first polymer sheet, moving a second substantially flat surface of the tool into contact with the second polymer sheet, maintaining a gap between the first polymer sheet and the second polymer sheet at a predetermined area, heating one of the two substantially flat surfaces of the tool to heat one of the first polymer sheet and the second polymer sheet and joining the first polymer sheet and the second polymer sheet together at locations outside of the predetermined area to define a peripheral bond of the chamber.

Clause 2: The method of Clause 1, wherein maintaining the gap between the first polymer sheet and the second polymer sheet includes adding a tensile element defining the predetermined area between the first polymer sheet and the second polymer sheet.

Clause 3: The method of Clause 2, wherein heating the one of the two substantially flat surfaces of the tool heats an entire surface of the one of the two polymer sheets.

Clause 4: The method of Clause 2, wherein adding the tensile element defining the predetermined area between the first polymer sheet and the second polymer sheet includes positioning a first tensile layer of the tensile element in contact with the first polymer sheet and positioning a second tensile layer of the tensile element in contact with the second polymer sheet.

Clause 5: The method of Clause 4, wherein heating one of the two substantially flat surfaces of the tool bonds one of the first polymer sheet and the second polymer sheet to a respective one of the first tensile layer and the second tensile layer.

Clause 6: The method of Clause 5, further comprising moving the second substantially flat surface of the tool away from the second polymer sheet after joining the first polymer sheet and the second polymer sheet, positioning the second polymer sheet on the substantially first flat surface of the tool, moving the second substantially flat surface of the tool into contact with the first polymer sheet, and heating the one of the two substantially flat surfaces of the tool to heat the other of the first polymer sheet and the second polymer sheet.

Clause 7: The method of Clause 6, wherein heating the other of the first polymer sheet and the second polymer sheet causes the other of the first polymer sheet and the second polymer sheet to bond to a respective one of the first tensile layer and the second tensile layer.

Clause 8: The method of Clause 4, further comprising heating the other of the two substantially flat surfaces of the tool to heat a surface of the other of the first polymer sheet and the second polymer sheet.

Clause 9: The method of Clause 8, wherein joining the first polymer sheet and the second polymer sheet together at locations outside of the predetermined area includes joining the first polymer sheet to the first tensile layer and joining the second polymer sheet to the second tensile layer at locations within the predetermined area.

Clause 10: The method of Clause 1, further comprising positioning a jig between the first polymer sheet and the substantially first flat surface of the tool.

Clause 11: The method of Clause 10, wherein maintaining the gap between the first polymer sheet and the second polymer sheet at the predetermined area includes maintaining the gap between the first polymer sheet and the second polymer sheet within a void defined by the jig.

Clause 12: The method of Clause 1, further comprising supplying a pressurized fluid into an area between the first polymer sheet and the second polymer sheet after joining the first polymer sheet and the second polymer sheet together to inflate the chamber.

Clause 13: A method of forming a chamber, the method comprising positioning a jig defining an interior void in a first position on a first surface of a tool, positioning a first polymer sheet on the jig, positioning a second polymer sheet on the first polymer sheet, moving a second surface of the tool into contact with the second polymer sheet, heating the tool to heat one of the first polymer sheet and the second polymer sheet, and joining the first polymer sheet and the second polymer sheet together at locations outside of the interior void defined by the jig to define a peripheral bond of the chamber.

Clause 14: The method of Clause 13, further comprising maintaining a gap between the first polymer sheet and the second polymer sheet, the gap having a predetermined area including a shape defined by the interior void of the jig.

Clause 15: The method of Clause 14, wherein heating the tool to heat the one of the first polymer sheet and the second polymer sheet includes heating the second surface of the tool to heat the second polymer sheet.

Clause 16: The method of Clause 15, further comprising moving the second surface of the tool away from the second polymer sheet after heating the second polymer sheet, positioning the second polymer sheet on the jig, moving the second surface of the tool into contact with the first polymer sheet, and heating the second surface of the tool to heat the first polymer sheet.

Clause 17: The method of Clause 16, wherein positioning the second polymer sheet on the jig includes positioning the peripheral bond on the jig.

Clause 18: The method of Clause 15, further comprising moving the second surface of the tool away from the second polymer sheet after heating the second polymer sheet, rotating the jig 180°, positioning the jig in a second position on the first surface of the tool after rotating the jig 180°, positioning the second polymer sheet on the jig, moving the second surface of the tool into contact with the first polymer sheet, heating the second surface of the tool to heat the first polymer sheet, and joining the first polymer sheet and the second polymer sheet together at locations outside of the interior void defined by the jig to define the peripheral bond of the chamber.

Clause 19: The method of Clause 18, further comprising maintaining the gap between the first polymer sheet and the second polymer sheet at the predetermined area within the interior void defined by the jig.

Clause 20: The method of Clause 18, wherein positioning the second polymer sheet on the jig includes positioning the peripheral bond on the jig when the jig is in the second position.

Clause 21: The method of Clause 13, further comprising supplying a pressurized fluid into an area between the first polymer sheet and the second polymer sheet after joining the first polymer sheet and the second polymer sheet together to inflate the chamber.

Clause 22: The method of Clause 13, wherein positioning a first polymer sheet on the jig includes positioning a first thermoformed polymer sheet on the jig.

Clause 23: The method of Clause 22, wherein positioning a second polymer sheet on the first polymer sheet comprises positioning a second thermoformed polymer sheet on the first thermoformed polymer sheet.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of forming a chamber, the method comprising:
   positioning a first polymer sheet on a substantially first flat surface of a tool;
   positioning a second polymer sheet on the first polymer sheet;
   moving a second substantially flat surface of the tool into contact with the second polymer sheet;
   positioning a first tensile layer of a tensile element in contact with the first polymer sheet and positioning a second tensile layer of the tensile element in contact with the second polymer sheet, the tensile element maintaining a gap between the first polymer sheet and the second polymer sheet at a predetermined area;
   heating one of the two substantially flat surfaces of the tool to heat one of the first polymer sheet and the second polymer sheet to bond one of the first polymer sheet and the second polymer sheet to a respective one of the first tensile layer and the second tensile layer;
   joining the first polymer sheet and the second polymer sheet together at locations outside of the predetermined area to define a peripheral bond of the chamber;
   moving the second substantially flat surface of the tool away from the second polymer sheet after joining the first polymer sheet and the second polymer sheet;
   positioning the second polymer sheet on the substantially first flat surface of the tool;
   moving the second substantially flat surface of the tool into contact with the first polymer sheet; and
   heating the one of the two substantially flat surfaces of the tool to heat the other of the first polymer sheet and the second polymer sheet.

2. The method of claim 1, wherein heating the one of the two substantially flat surfaces of the tool heats an entire surface of the one of the two polymer sheets.

3. The method of claim 1, wherein heating the other of the first polymer sheet and the second polymer sheet causes the other of the first polymer sheet and the second polymer sheet to bond to a respective one of the first tensile layer and the second tensile layer.

4. The method of claim 1, further comprising heating the other of the two substantially flat surfaces of the tool to heat a surface of the other of the first polymer sheet and the second polymer sheet.

5. The method of claim 4, wherein joining the first polymer sheet and the second polymer sheet together at locations outside of the predetermined area includes joining the first polymer sheet to the first tensile layer and joining the second polymer sheet to the second tensile layer at locations within the predetermined area.

6. The method of claim 1, further comprising supplying a pressurized fluid into an area between the first polymer sheet and the second polymer sheet after joining the first polymer sheet and the second polymer sheet together to inflate the chamber.

7. A method of forming a chamber, the method comprising:
- positioning a jig defining an interior void in a first position on a first surface of a tool;
- positioning a first polymer sheet on the jig;
- positioning a second polymer sheet on the first polymer sheet;
- causing the first polymer sheet to enter the interior void to create a gap between the first polymer sheet and the second polymer sheet at a location of the interior void;
- moving a second surface of the tool into contact with the second polymer sheet;
- heating the second surface of the tool to heat the second polymer sheet;
- joining the first polymer sheet and the second polymer sheet together at locations outside of the interior void defined by the jig to define a peripheral bond of the chamber, the chamber having a same shape as a shape of the interior void;
- moving the second surface of the tool away from the heated second polymer sheet after heating the second polymer sheet;
- positioning the heated second polymer sheet on the jig;
- moving the second surface of the tool into contact with the first polymer sheet; and
- heating the second surface of the tool to heat the first polymer sheet.

8. The method of claim 7, wherein positioning the heated second polymer sheet on the jig includes positioning the peripheral bond on the jig.

9. The method of claim 7, further comprising, after moving the second surface of the tool away from the second polymer sheet after heating the second polymer sheet:
- rotating the jig 180°;
- positioning the jig in a second position on the first surface of the tool after rotating the jig 180°;
- positioning the second polymer sheet on the jig;
- moving the second surface of the tool into contact with the first polymer sheet;
- heating the second surface of the tool to heat the first polymer sheet; and
- joining the first polymer sheet and the second polymer sheet together at locations outside of the interior void defined by the jig to define the peripheral bond of the chamber.

10. The method of claim 9, further comprising maintaining the gap between the first polymer sheet and the second polymer sheet at an area of the interior void defined by the jig.

11. The method of claim 9, wherein positioning the second polymer sheet on the jig includes positioning the peripheral bond on the jig when the jig is in the second position.

12. The method of claim 7, further comprising supplying a pressurized fluid into an area between the first polymer sheet and the second polymer sheet after joining the first polymer sheet and the second polymer sheet together to inflate the chamber.

13. The method of claim 7, wherein positioning a first polymer sheet on the jig includes positioning a first thermoformed polymer sheet on the jig.

* * * * *